US012154361B2

(12) United States Patent
Chen et al.

(10) Patent No.: US 12,154,361 B2
(45) Date of Patent: Nov. 26, 2024

(54) METHOD AND APPARATUS OF IMAGE-TO-DOCUMENT CONVERSION BASED ON OCR, DEVICE, AND READABLE STORAGE MEDIUM

(71) Applicant: Tencent Technology (Shenzhen) Company Limited, Guangdong (CN)

(72) Inventors: Xingyao Chen, Shenzhen Guangdong (CN); Canlu Huang, Shenzhen Guangdong (CN); Wencan Hu, Shenzhen Guangdong (CN); Yidong Chen, Guangdong (CN); Hanquan Lin, Guangdong (CN); Fei Huang, Guangdong (CN); Geyang Ke, Guangdong (CN); Zhiquan Yang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 345 days.

(21) Appl. No.: 17/313,755

(22) Filed: May 6, 2021

(65) Prior Publication Data

US 2021/0256253 A1    Aug. 19, 2021

Related U.S. Application Data

(63) Continuation of application No. PCT/CN2020/078181, filed on Mar. 6, 2020.

(30) Foreign Application Priority Data

Mar. 22, 2019   (CN) .......................... 201910224228.1

(51) Int. Cl.
*G06F 17/00*     (2019.01)
*G06F 18/214*    (2023.01)
(Continued)

(52) U.S. Cl.
CPC .......... *G06V 30/414* (2022.01); *G06F 18/214* (2023.01); *G06F 40/106* (2020.01);
(Continued)

(58) Field of Classification Search
CPC .. G06V 30/414; G06V 30/1463; G06V 10/44; G06V 30/15; G06V 30/10; G06F 40/106; G06F 18/214
See application file for complete search history.

(56) References Cited

U.S. PATENT DOCUMENTS 5,784,487 A * 7/1998 Cooperman ......... G06V 30/416
                                                  382/175
5,966,455 A * 10/1999 Saito .................... G06V 30/413
                                                  715/234
(Continued)

FOREIGN PATENT DOCUMENTS

CN    102567300 A    7/2012
CN    106503629 A    3/2017
(Continued)

OTHER PUBLICATIONS

International Search Report issued May 28, 2020 in International Application No. PCT/CN2020/078181, with English translation, 7 pgs.

*Primary Examiner* — Mohammed H Zuberi
(74) *Attorney, Agent, or Firm* — ArentFox Schiff LLP

(57) ABSTRACT

A method of image-to-document conversion based on optical character recognition (OCR) includes obtaining an image to be converted into a target document, and performing layout segmentation on the image according to image content of the image, to obtain n image layouts, each of the n image layouts corresponding to a content type, and n being a positive integer. The method also includes, for each of the n image layouts, processing image content in the respective image layout according to the content type corresponding to (Continued)

the respective image layout, to obtain converted content corresponding to the respective image layout. The method further includes adding the converted content corresponding to the n image layouts to an electronic document, to obtain the target document.

20 Claims, 21 Drawing Sheets

(51) Int. Cl.
    *G06F 40/106*     (2020.01)
    *G06V 10/44*     (2022.01)
    *G06V 30/146*     (2022.01)
    *G06V 30/148*     (2022.01)
    *G06V 30/414*     (2022.01)
    *G06V 30/10*     (2022.01)

(52) U.S. Cl.
    CPC .......... *G06V 10/44* (2022.01); *G06V 30/1463* (2022.01); *G06V 30/15* (2022.01); *G06V 30/10* (2022.01); *G06V 30/146* (2022.01)

(56) References Cited

U.S. PATENT DOCUMENTS

| | | | | |
|---|---|---|---|---|
| 6,175,844 B1* | 1/2001 | Stolin | ................ | G06V 30/414 |
| | | | | 715/210 |
| 8,249,356 B1* | 8/2012 | Smith | ................ | G06V 30/414 |
| | | | | 382/199 |
| 10,477,052 B2* | 11/2019 | Oya | ................ | G06V 30/1463 |
| 10,706,322 B1* | 7/2020 | Yang | ................ | G06V 10/82 |
| 11,321,956 B1* | 5/2022 | Geng | ................ | G06F 40/30 |
| 11,393,236 B2* | 7/2022 | Bellert | ................ | G06V 30/414 |
| 11,615,244 B2* | 3/2023 | Erdemir | ................ | G06V 30/413 |
| | | | | 704/9 |
| 2004/0114814 A1* | 6/2004 | Boliek | ................ | H04N 19/46 |
| | | | | 375/E7.199 |
| 2006/0271847 A1* | 11/2006 | Meunier | ................ | G06V 30/416 |
| | | | | 715/255 |
| 2008/0063279 A1* | 3/2008 | Vincent | ................ | G06F 18/254 |
| | | | | 382/182 |
| 2008/0144977 A1* | 6/2008 | Meyer | ................ | G06V 30/262 |
| | | | | 382/309 |
| 2009/0016647 A1* | 1/2009 | Hamaguchi | ................ | H04N 1/3873 |
| | | | | 382/305 |
| 2012/0177295 A1* | 7/2012 | Gronau | ................ | G06V 30/12 |
| | | | | 382/218 |
| 2013/0195376 A1* | 8/2013 | Baheti | ................ | G06V 30/18095 |
| | | | | 382/289 |
| 2015/0077817 A1* | 3/2015 | Shimazaki | ................ | G06V 10/507 |
| | | | | 358/538 |
| 2015/0286888 A1 | 10/2015 | Maison | | |
| 2016/0055376 A1* | 2/2016 | Koduru | ................ | G06V 30/412 |
| | | | | 382/176 |
| 2016/0188612 A1* | 6/2016 | Tecu | ................ | G06F 16/116 |
| | | | | 707/756 |
| 2017/0148371 A1* | 5/2017 | Qian | ................ | G06T 1/20 |
| 2018/0121756 A1* | 5/2018 | Becker | ................ | G06V 30/224 |
| 2018/0373952 A1* | 12/2018 | Bui | ................ | G06V 30/153 |
| 2020/0089998 A1* | 3/2020 | Zagaynov | ................ | G06F 18/2148 |
| 2020/0327351 A1* | 10/2020 | Abedini | ................ | G06N 20/00 |
| 2021/0073566 A1* | 3/2021 | Hoehne | ................ | G06T 7/10 |

FOREIGN PATENT DOCUMENTS

| | | |
|---|---|---|
| CN | 107301418 A | 10/2017 |
| CN | 108038093 A | 5/2018 |
| CN | 109493350 A | 3/2019 |
| CN | 109933756 A | 6/2019 |

* cited by examiner

FIG. 29

METHOD AND APPARATUS OF IMAGE-TO-DOCUMENT CONVERSION BASED ON OCR, DEVICE, AND READABLE STORAGE MEDIUM

RELATED APPLICATIONS

This application is a continuation of International Application No. PCT/CN2020/078181, filed on Mar. 6, 2020, which claims priority to Chinese Patent Application No. 201910224228.1, entitled "METHOD AND APPARATUS OF IMAGE-TO-DOCUMENT CONVERSION BASED ON OCR, DEVICE, AND READABLE STORAGE MEDIUM" and filed on Mar. 22, 2019. The entire disclosures of the prior applications are hereby incorporated by reference in their entirety.

FIELD OF THE TECHNOLOGY

Embodiments of this application relate to the field of artificial intelligence, including a method and apparatus of image-to-document conversion based on optical character recognition (OCR).

BACKGROUND OF THE DISCLOSURE

OCR is a function for recognizing characters in an image. Generally, a user inputs an image with characters to an optical character recognition module, and obtains an output result. The output result includes the characters in the image that are obtained through recognition. OCR technologies may be applied to various fields, such as license plate recognition and document conversion. Document conversion is the conversion of an image including characters into an editable document format.

In the related art, during conversion, after an image with characters is inputted to a document conversion module, the document conversion module obtains the characters in the image through OCR recognition, and sequentially copies the recognized text into an electronic document. After the user organizes the typesetting of the document according to the text copied, a complete electronic document is obtained.

SUMMARY

Embodiments of this application provide a method of image-to-document conversion based on OCR, which can resolve the problem that typesetting, table content, image content cannot be recognized in combination with the text, causing a large amount of resource consumption required for organizing typesetting of a document by a user and relatively low document recognition efficiency.

In an embodiment, a method of image-to-document conversion based on optical character recognition (OCR) includes obtaining an image to be converted into a target document, and performing layout segmentation on the image according to image content of the image, to obtain n image layouts, each of the n image layouts corresponding to a content type, and n being a positive integer. The method also includes, for each of the n image layouts, processing image content in the respective image layout according to the content type corresponding to the respective image layout, to obtain converted content corresponding to the respective image layout. The method further includes adding the converted content corresponding to the n image layouts to an electronic document, to obtain the target document.

In an embodiment, a method of image-to-document conversion based on optical character recognition (OCR) includes displaying a conversion interface, the conversion interface including a conversion control and an image selection region. The method also includes selecting an image in the image selection region, the image to be converted into a target document, and triggering a conversion function corresponding to the conversion control in response to triggering of the conversion control, the conversion function converting an image into a document format. The method further includes displaying a target document display interface, the target document display interface including the target document obtained after the image is converted, a typesetting manner of the target document corresponding to a typesetting manner of the image. The target document is obtained by the conversion function by performing layout segmentation on the image according to image content of the image, to obtain n image layouts, each of the image layouts corresponding to a content type, and n being a positive integer. The target document is then obtained by, processing, for each of the n image layouts, image content in the respective image layout according to the content type corresponding to the respective image layout, to obtain converted content corresponding to the respective image layout. The target document is further obtained by adding the converted content corresponding to the n image layouts to an electronic document, to obtain the target document.

In an embodiment, an apparatus of image-to-document conversion based on optical character recognition (OCR) includes processing circuitry configured to obtain an image to be converted into a target document, and perform layout segmentation on the image according to image content of the image, to obtain n image layouts, each of the image layouts being corresponding to a content type, and n being a positive integer. The processing circuitry is also configured to process, for each of the image layouts, image content in the respective image layout according to the content type corresponding to the respective image layout, to obtain converted content corresponding to the respective image layout. The processing circuitry is further configured to add the converted content corresponding to the n image layouts to an electronic document, to obtain the target document.

BRIEF DESCRIPTION OF THE DRAWINGS

To describe the technical solutions in embodiments of this application more clearly, the following briefly describes the accompanying drawings describing the embodiments. The accompanying drawings in the following descriptions show exemplary embodiments of this application, and a person of ordinary skill in the art may still derive other drawings from the accompanying drawings.

FIG. 29 is a schematic diagram of an image-to-document conversion result according to some exemplary embodiments of this application.

DESCRIPTION OF EMBODIMENTS

Figure 1:
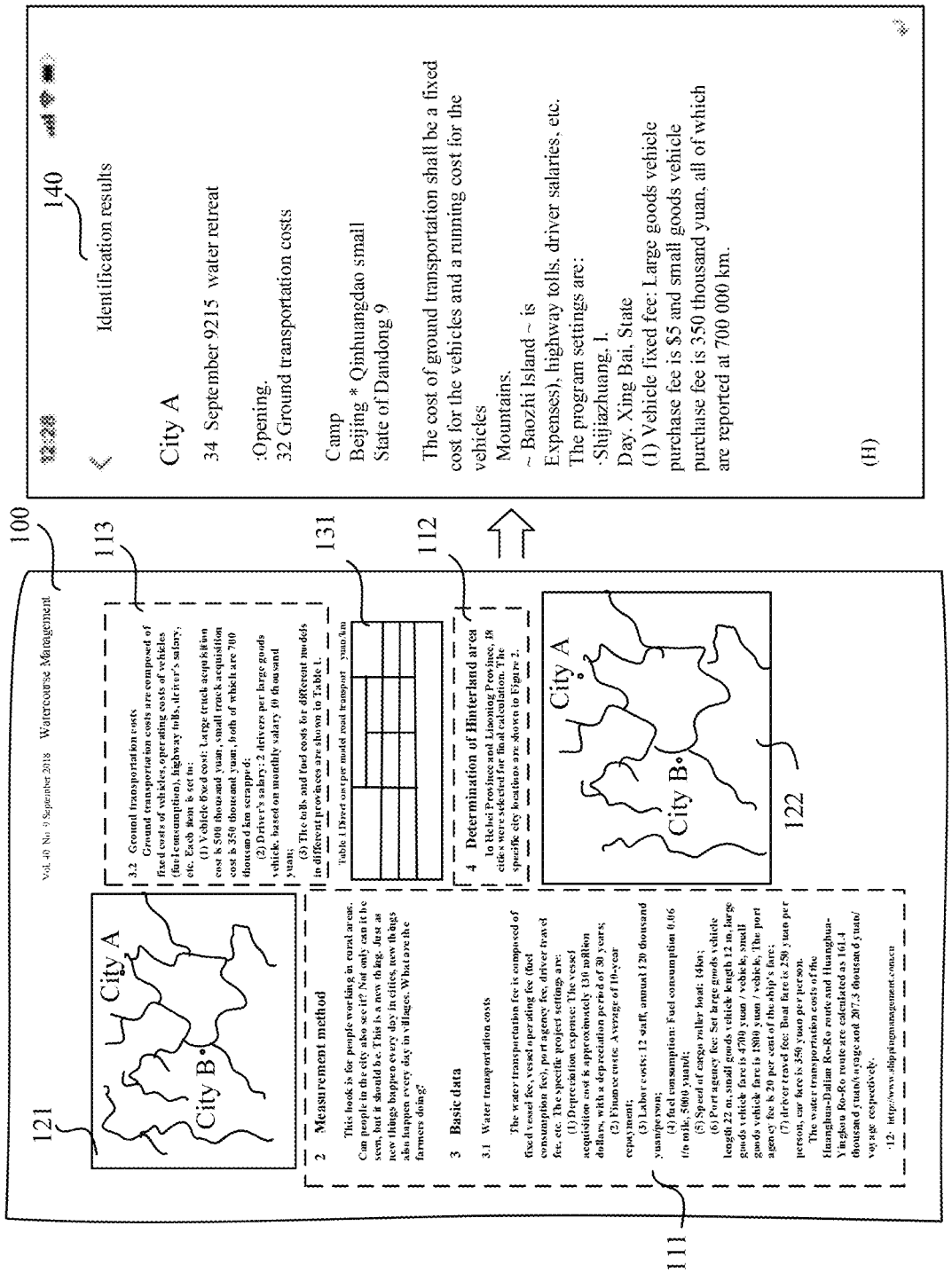
FIG. 1 is a schematic diagram of a recognition result obtained by performing character recognition for a to-be-converted image according to some exemplary embodiments of this application.

To make the objectives, technical solutions, and advantages of this application clearer, implementations of this application are further described below in detail with reference to the accompanying drawings.

In some conversion manners, during conversion, OCR can only recognize text content in images, and content in the images is usually relatively complex. Consequently, typesetting, table content, image content, and the like of text cannot be recognized in combination with the text, causing a large amount of resource consumption required for organizing typesetting of a document by a user and relatively low document recognition efficiency.

In embodiments of this application, layout segmentation is performed for a to-be-converted image by using image content in the to-be-converted image, to segment the to-be-converted image into n image layouts respectively corresponding to types of content. Image content in the image layouts is processed for content types of the image layouts, thereby implementing recognition processing for different types of content in the to-be-converted image in different manners, and avoiding a problem that a format in a document after conversion is disordered because only text in the to-be-converted image can be recognized, and a large quantity of resources need to be consumed for organizing typesetting of the document by a user, causing relatively low document recognition efficiency, and improving conversion accuracy in image-to-document conversion.

First, terms described in the embodiments of this application are briefly introduced.

Optical character recognition (OCR) is a process of converting text in a to-be-recognized file into a text format through character recognition. Generally, an OCR process can only be completed after steps such as input of a to-be-recognized file, text feature extraction, and comparison recognition.

A to-be-converted image is an image whose image content is to be converted into a target document. In some embodiments, the to-be-converted image may be implemented as at least one of a photo, a picture, and a portable document format (PDF). In some embodiments, the to-be-converted image may be obtained by a user by photographing a paper document, or may be selected from existing images in a terminal album by the user. In some embodiments, a target document obtained after the to-be-converted image is converted may be a document whose version is editable. That is, the user may edit content in the target document. In some embodiments, after the to-be-converted image is converted, an obtained target document includes at least one of text content, table content, picture content, and formula content. That is, the to-be-converted image includes at least one of content of a text type, content of a table type, content of a picture type, and content of a formula type.

An image layout is a layout obtained after layout segmentation is performed on a to-be-converted image according to types of image content. In some embodiments, each image layout corresponds to a content type. For example, after layout segmentation is performed for a to-be-converted image A, four layouts are obtained: a content type corresponding to a layout 1 is text, a content type corresponding to a layout 2 is a table, a content type corresponding to a layout 3 is a picture, and a content type corresponding to a layout 4 is text.

In the related art, during conversion, after a to-be-converted image is inputted to a document conversion module, the document conversion module obtains characters in the image through OCR recognition, and sequentially copies the recognized text into an electronic document. A user organizes the typesetting of the document according to the text copied, to obtain a complete electronic document. For recognition for characters by the document conversion module, line-direction recognition is performed according to text in the to-be-converted image. That is, the text in the to-be-converted image is recognized sequentially according to lines which are outputted, and recognized characters for the same line are outputted as a paragraph of content in an electronic document.

For example, referring to FIG. 1, a to-be-converted image 100 includes text content 111, text content 112, text content 113, picture content 121, picture content 122, and table content 131. After the to-be-converted image 100 is converted by a method known in the art, a recognition result 140 is obtained. The recognition result only includes text content and text "city A" in the picture content 121 in the to-be-converted image 100 is recognized as text content "city A" in the recognition result 140. As shown, recognition accuracy of the recognition result 140 is quite low. The recognition result 140 lacks the picture content 121, the picture content 122, and the table content 131. A user needs to do a large amount of typesetting work and organizing and supplement work for the recognition result 140, to supplement the picture content 121, the picture content 122, and the table content 131, and supplement text lacked in the text content 111, the text content 112, and the text content 113, then an electronic document corresponding to the to-be-converted image 100 can be obtained.

In some embodiments, a method of image-to-document conversion based on OCR provided in this application is applicable to a terminal, or is applicable to an implementation environment in which a terminal interacts with a server. When the method is applied to a terminal, after a user selects a to-be-converted image in the terminal, the terminal converts the to-be-converted image into an electronic document in an editable format. When the method is applied to an implementation environment in which a terminal interacts with a server, the terminal selects and uploads a to-be-converted image, and the server inputs converted content to an electronic document in an editable format after converting the to-be-converted image. The server then sends the electronic document to the terminal for displaying. The user may edit content such as text content, table content, and picture content in the electronic document on the terminal.

Figure 2:
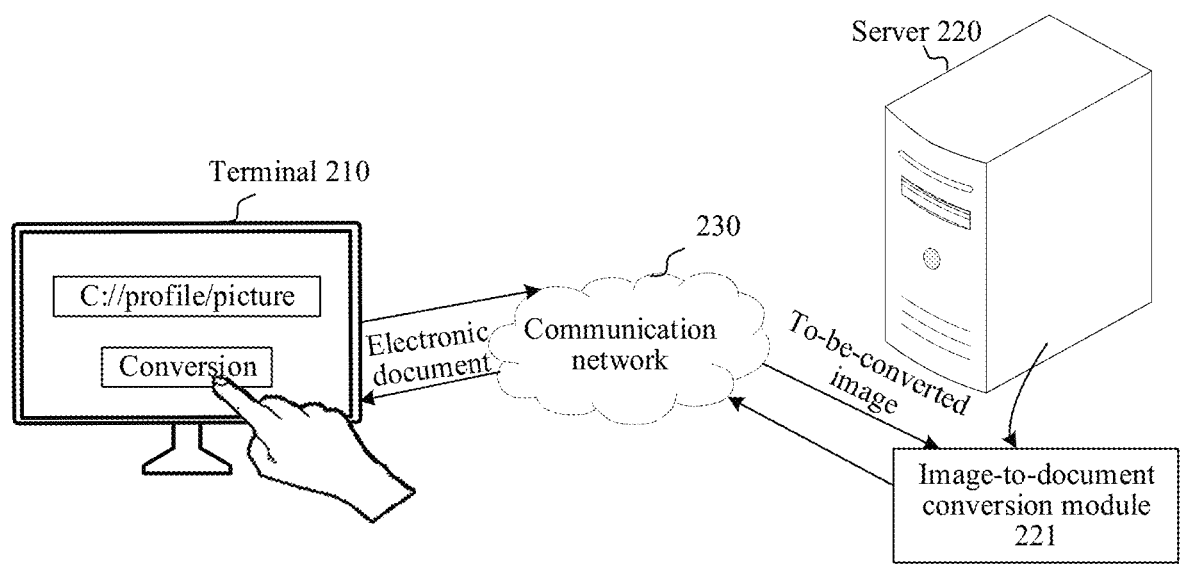
FIG. 2 is a schematic diagram of an implementation environment according to some exemplary embodiments of this application.

In this embodiment, a description is made by using an example in which the method of image-to-document conversion based on OCR is applied to an image-to-document conversion system in which a terminal interacts with a server. As shown in FIG. 2, the image-to-document conversion system includes a terminal 210, a server 220, and a communication network 230. The server 220 includes an image-to-document conversion module 221.

In some embodiments, an image-to-conversion function is provided in the terminal 210. The image-to-conversion function may be provided by an application program installed in the terminal, or may be provided by the terminal. In some embodiments, the application program may be at least one of a document processing application program, a social application program, a financial management application program, and an audio-video application program. In some embodiments, after selecting a to-be-converted image that needs to be converted in the terminal 210, the user uploads the to-be-converted image to the server 220 by using the communication network 230. In some embodiments, the to-be-converted image may be an image photographed by using the terminal 210 by the user, or may be an image downloaded or uploaded by the user by using the terminal 210, or may alternatively be an image stored in the terminal. A form of the to-be-converted image includes any one of a picture, a PDF, and another file format.

After the server 220 converts the to-be-converted image into a document by using the image-to-document conversion module 221 to obtain an electronic document, and sends the electronic document to the terminal 210 for displaying, the user may perform an editing operation on the electronic document in the terminal 210.

Figure 3:
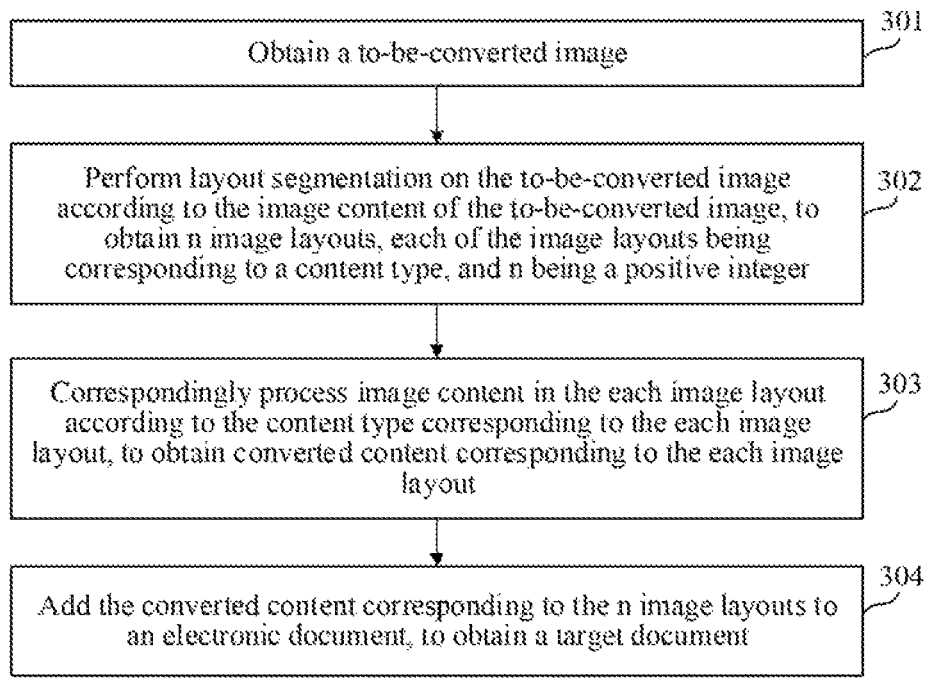
FIG. 3 is a flowchart of a method of image-to-document conversion based on OCR according to some exemplary embodiments of this application.

The method of image-to-document conversion based on OCR provided in the embodiments of this application is described with reference to the foregoing brief introduction of the terms and the description for the implementation environment. FIG. 3 is a flowchart of a method of image-to-document conversion based on OCR according to some exemplary embodiments of this application. The description is made with reference to an example in which the method is applied to a server. As shown in FIG. 3, the method includes the following steps:

In step 301, a to-be-converted image is obtained.

In some embodiments, the to-be-converted image is an image whose image content is to be converted into a target document.

In some embodiments, manners of obtaining the to-be-converted image include at least one of the following manners:

In one manner, an image sent by a terminal is received, to obtain the to-be-converted image. The image sent by the terminal may be an image obtained by the terminal through photographing, or may be an image obtained by the terminal through downloading, or may be an image obtained by the terminal by receiving content inputted by an external storage device. This is not limited in the embodiments of this application. In some embodiments, before uploading, the user may alternatively manually frame (select) some images that need to be uploaded.

In another manner, an image newly generated is obtained from a memory, to obtain the to-be-converted image. Alternatively, an image first generated is obtained from the memory, to obtain the to-be-converted image.

In still another manner, after an image is downloaded according to a downloading link, the to-be-converted image is obtained.

The foregoing three manners are merely e examples, and the manner of obtaining the to-be-converted image is not limited in the embodiments of this application.

In some embodiments, the to-be-converted image is a pre-processed image, and manners of pre-processing include at least one of image framing and image rectification.

Figure 4:
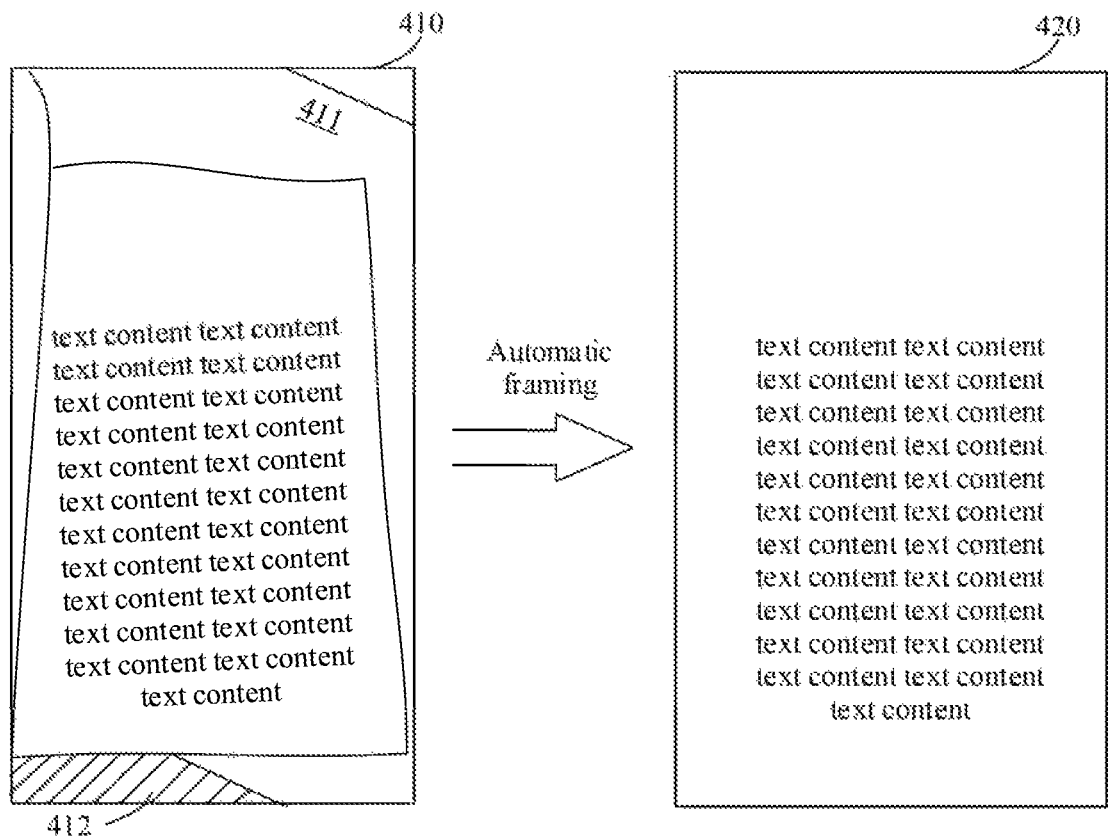
FIG. 4 is a schematic diagram of an automatic framing process according to the embodiments shown in FIG. 3.

In some embodiments, the image framing is to automatically frame a picture part that needs to be converted in the to-be-converted image, and remove unnecessary parts in the to-be-converted image, such as a margin part and a non-document content part. For example, when a book is placed on a table surface for photographing, photographed image content further includes other objects on the table surface. Edges of the book are framed through automatic framing, and the other objects on the table surface are removed. For example, referring to FIG. 4, after automatic framing processing is performed on an image 410 before framing, an image 420 after framing is obtained, and parts such as a table surface 411 and a shadow 412 in the image 410 before framing are removed.

In some embodiments, during the automatic framing, detection may be performed for framed edges by using an OpenCV algorithm, such as a Canny algorithm or a Sobel algorithm, or by using a deep learning algorithm, for example, to perform detection on the framed edges by using an edge detection algorithm (holistically-nested edge detection (HED). Detection of the framed edges by using the OpenCV algorithm is relatively fine and has a relatively good edge fitting effect, but has a relatively large quantity of noisy edges and poor robustness; in addition, detection of the framed edges by using the deep learning algorithm has relatively good adaptability, but has relatively coarse edges and incompact edge fitting. Therefore, the OpenCV algorithm and the deep learning algorithm may alternatively be combined for application in this embodiment. For example, by using the HED edge detection algorithm as an example, first, after the framed edges are detected by using the HED edge detection algorithm, a detection result is detected again by using the OpenCV algorithm. In some embodiments, relatively complex detection results are combined by using a transform extraction line (Hough line), length sorting is performed according to detected regions, and short lines and interference lines are removed. In some embodiments, for the framed edges and with reference to features of the document, features such as a gradient direction and an aspect ratio may be designed to improve accuracy in detection of the framed edges. In some embodiments, a quantity of layers of a neural network in the foregoing HED edge detection algorithm may be simplified, to reduce time consumed for calculation.

Figure 5:
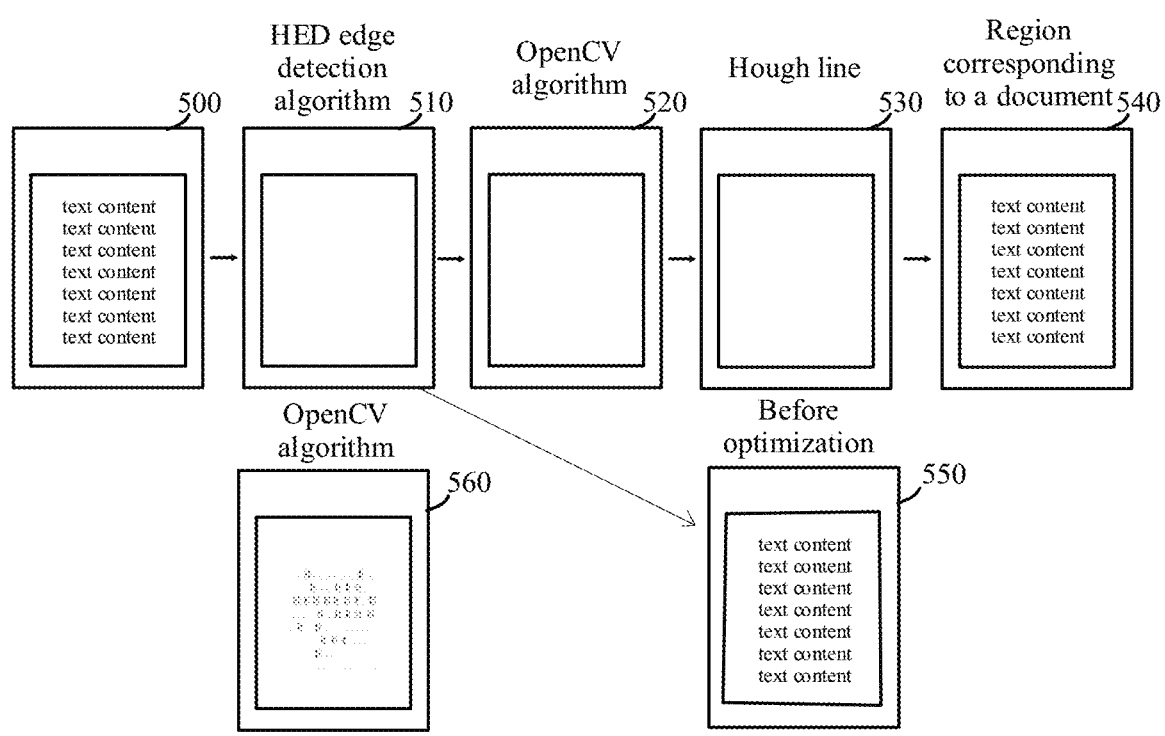
FIG. 5 is another schematic diagram of an automatic framing process according to the embodiments shown in FIG. 3.

For example, for the foregoing automatic framing process, refer to FIG. 5. As shown in FIG. 5, during automatic framing for a to-be-framed image 500, a framing result 510 is first obtained by using the HED edge detection algorithm, and the framing result 510 is detected by using the OpenCV algorithm, to obtain a framing result 520; and the framing result 520 is filtered through Hough transform by using a Hough line to obtain a framing result 530, and a final framed region 540 corresponding to the document is obtained. As a contrast, a framing result 550 detected by only using the HED edge detection algorithm and a framing result 560 detected by only using the OpenCV algorithm are demonstrated. Edge fitting between framing lines and document parts in the framing result 550 are relatively poor, and a relatively large amount of detailed interference content is included in the framing result 560.

Figure 6:
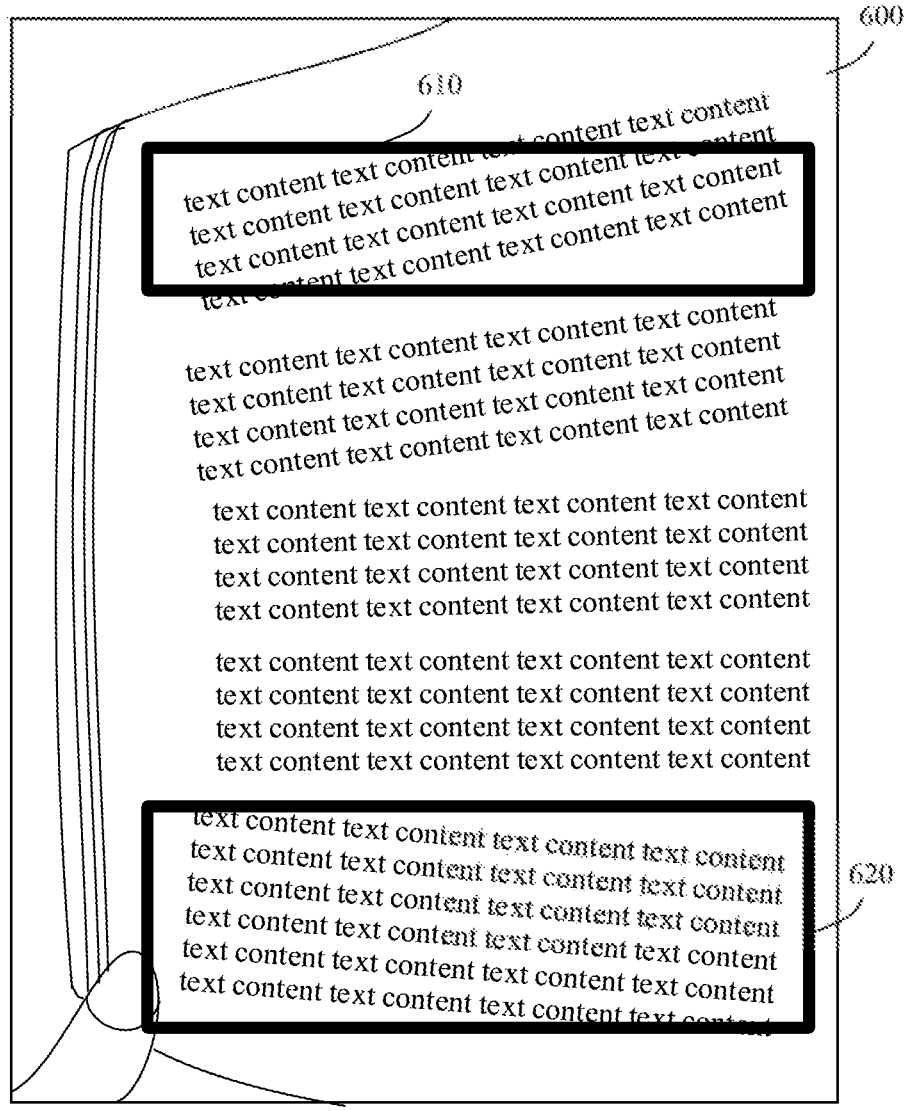
FIG. 6 is a schematic diagram of an image distortion state according to the embodiments shown in FIG. 3.

In some embodiments, image rectification is to rectify an image having a distortion to a normal flat plane state. In an actual scenario, when a user photographs a document, the document may be in a deformation state such as being folded or being bent, and consequently affecting an OCR recognition process, and affecting a subsequent layout segmentation process. As shown in FIG. 6, an image 600 has an obvious distortion state, and it can be learned from the framing for a first paragraph of text content by a rectangular box 610 and framing for a last paragraph of text content by the rectangular box 620 that, distortions of an upper portion and a lower portion of the image 600 are different.

Figure 7:
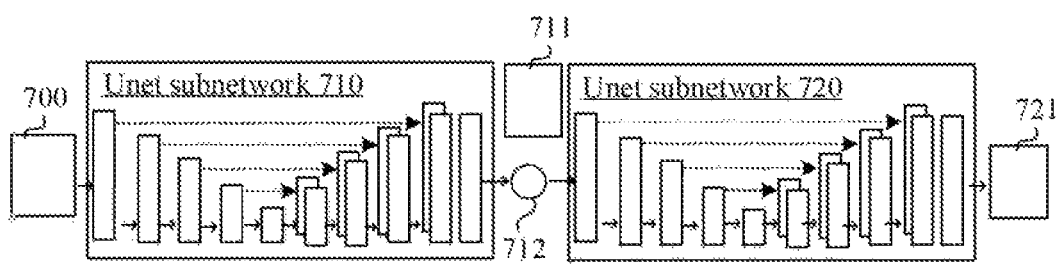
FIG. 7 is a schematic diagram of an image rectification process according to the embodiments shown in FIG. 3.
Figure 8:
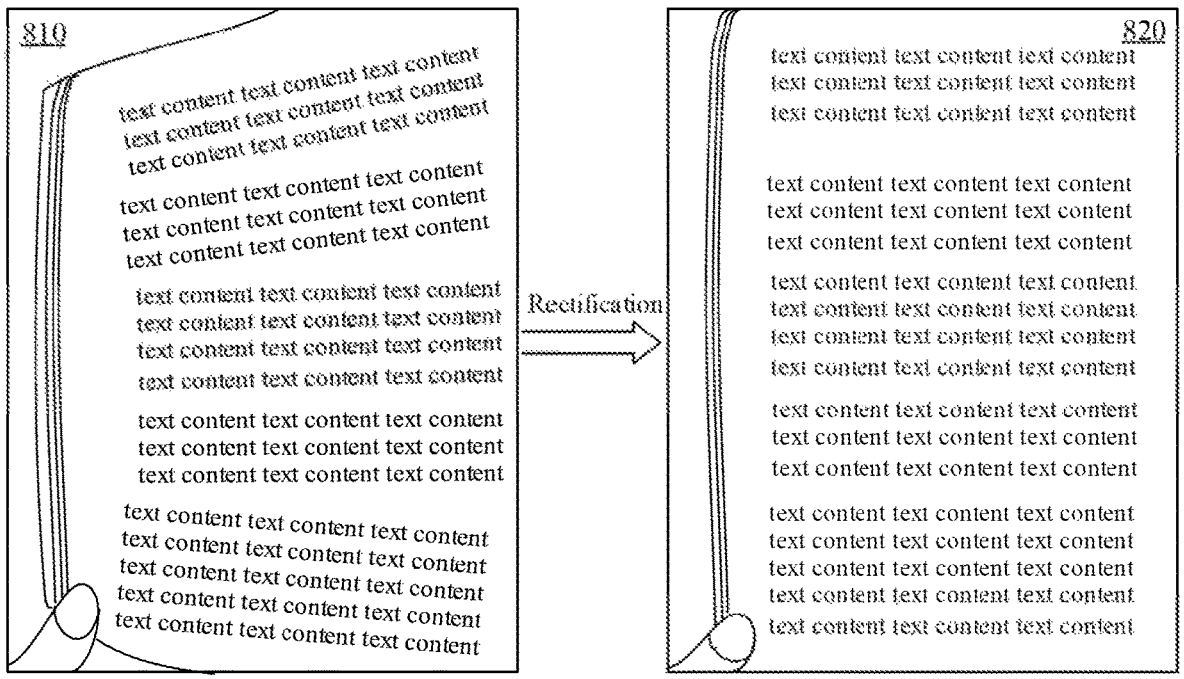
FIG. 8 is another schematic diagram of an image rectification process according to the embodiments shown in FIG. 3.

During rectification for the image, the rectification is performed by using a rectification network. In some embodiments, during rectification of the distorted image, actual coordinates of each pixel point in the image need to be predicted, so that a stack-type Unet structure may be used in the rectification network. As shown in FIG. 7, the rectification network includes two Unet subnetworks: a Unet subnetwork 710 and a Unet subnetwork 720. During rectification, a distorted image 700 is first inputted to the first Unet subnetwork 710 to obtain a first rectification result 711, and the first rectification result 711 and a feature image 712 obtained by a network layer in the first Unet subnetwork 710 are inputted to the second Unet subnetwork 720, to obtain a second rectification result 721 as an image rectification result. In some embodiments, the rectification result is shown in FIG. 8, a distorted image 810 is an image before the rectification, and an image 820 is the rectified image.

Figure 9:
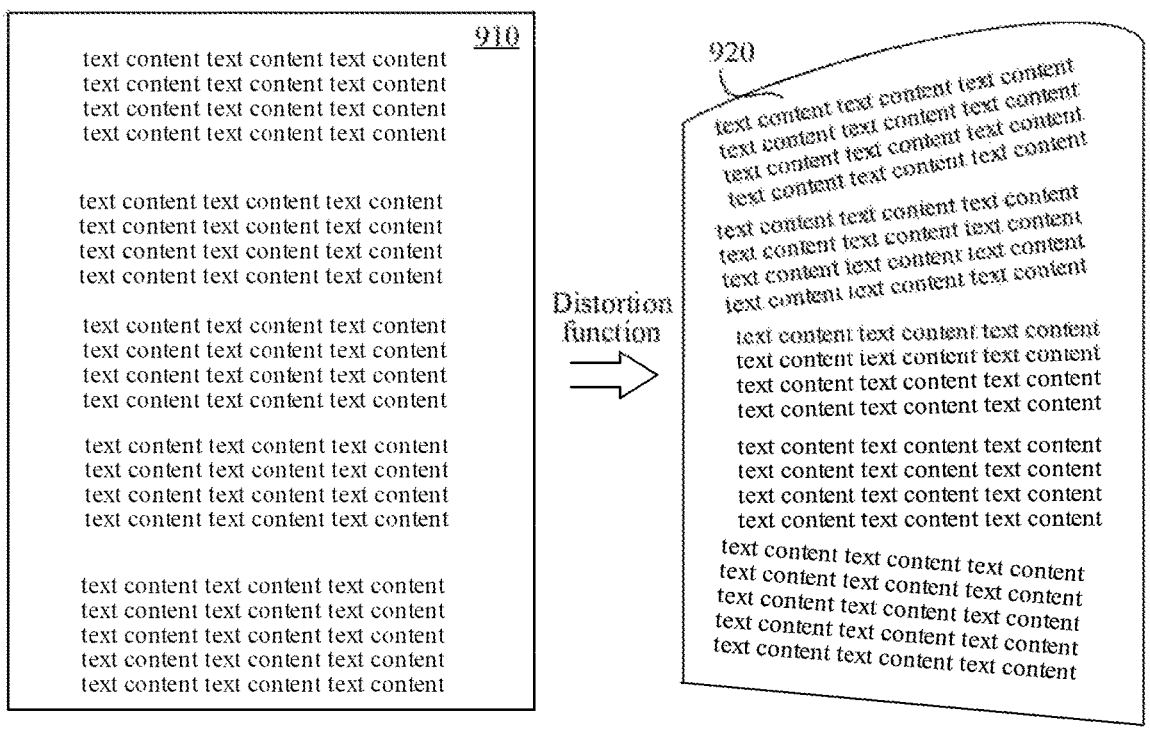
FIG. 9 is a schematic diagram of a simulation dataset generation manner according to the embodiments shown in FIG. 3.

In some embodiments, during training of the rectification network, a large quantity of distorted images and a dataset of rectified images corresponding to the distorted images are used, the distorted images and the rectified images need to be manually photographed by a technician, and a process of obtaining a training set is relatively complex. Therefore, in this embodiment of this application, sample images are processed by designing a distortion function, to obtain distorted images, and the distorted images and the sample images before the distortion form a simulation dataset for training the rectification network. That is, in the image rectification process, a to-be-rectified image is first obtained, and the to-be-rectified image is inputted to a rectification neural network, to output the to-be-converted image, the rectification neural network being a network obtained through training with a simulation dataset, simulation data in the simulation dataset being data obtained after distortion processing is performed on a sample image, the distortion processing being implemented by inputting the sample image to a distortion function. For example, referring to FIG. 9, after a sample image 910 is inputted to a distortion function for distortion processing, a distorted image 920 is obtained. The sample image 910 and the distorted image 920 form a group of simulation data.

Step 302: Perform layout segmentation on the to-be-converted image according to the image content of the to-be-converted image, to obtain n image layouts, each of the image layouts being corresponding to a content type, and n being a positive integer.

In some embodiments, each of the image layouts obtained through segmentation corresponds to a content type, the content type including at least one of: text, a table, a picture, a page number, a header and a footer, and a formula.

In some embodiments, each of the image layouts corresponds to a type identifier, the type identifier being used for representing a content type corresponding to the each image layout.

In some embodiments, a process of the layout segmentation includes two parts of process: image segmentation and post processing. The image segmentation process is mainly to recognize semantics of the to-be-converted image by using an encoder and a decoder to obtain a mask image; and post processing is mainly to perform at least one of processing such as denoising processing, combination processing, and intersection position cutting processing on the recognized mask image. The denoising processing being used for filtering out regions in the mask image whose areas are smaller than a preset area, the combination processing being used for combining consecutive regions belonging to the same content type, and the intersection position cutting processing being used for performing separation and cutting for regions that intersect each other.

In some embodiments, the encoder and the decoder may be an encoder and a decoder based on a neural network. The encoder is configured to classify regions corresponding to different content types in the to-be-converted image through semantic analysis. In some embodiments, each classified region corresponds to one type of semantics, and each type of semantics corresponds to one content type. That is, each classified region corresponds to one content type. The decoder is configured to upsample an image having been encoded by the encoder, to obtain a mask image. The mask image is used for identifying regions of different content types in different expression manners.

In step 303, for each of the image layouts, image content in the each image layout (the respective image layout) is processed according to the content type corresponding to the each image layout (the respective image layout), to obtain converted content corresponding to the each image layout (the respective image layout).

In some embodiments, for a different content type corresponding to an image layout, a manner of processing image content is also different. For example, for the text type of content, OCR recognition need to be performed for the image layout: for the table type of content, processing such as table border recognition and OCR recognition need to be performed for the image layout; for the picture type of content, picture cropping processing needs to be performed for the image layout; and for the formula type of content, picture cropping processing may also be performed for the image layout.

In step 304, the converted content corresponding to the n image layouts is added to an electronic document, to obtain a target document.

Figure 10:
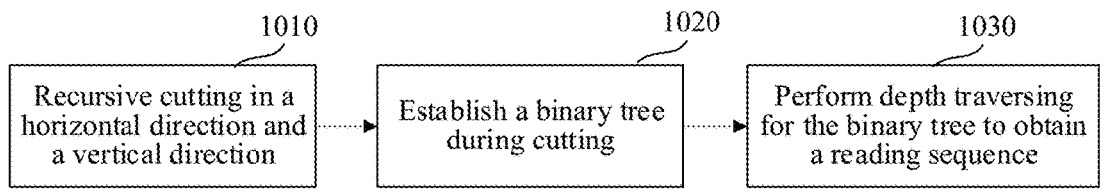
FIG. 10 is a flowchart of a method for determining a reading sequence according to the embodiments shown in FIG. 3.
Figure 11:
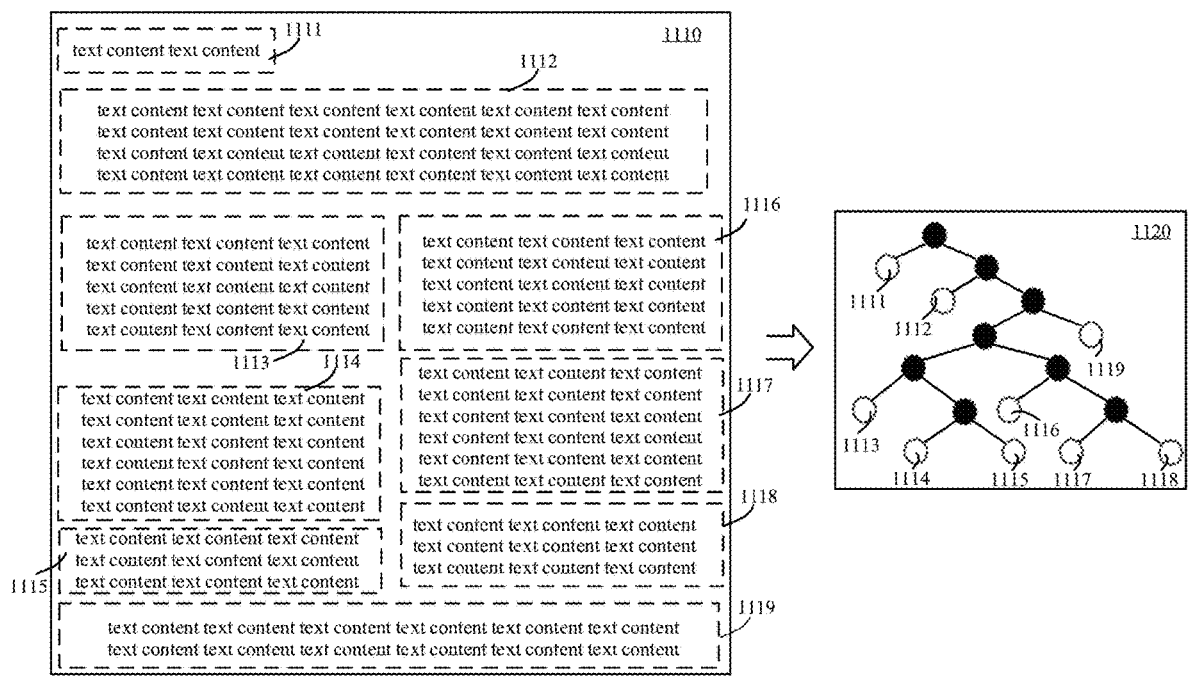
FIG. 11 is a schematic diagram of a correspondence between interface content and a binary graph provided in the method for determining a reading sequence shown in FIG. 10.

In some embodiments, since the converted content and the image content in the image layout may have problems such as a text size and a typesetting size, the converted content corresponding to some image layouts cannot be displayed in the target document, so that it is desirable to perform reading sorting for the image layouts. The reading sorting manner is to establish a binary tree for recursive cutting during the cutting of the image layouts, and then depth traversing is performed for the binary tree to restore a reading sequence. For example, for the reading sorting process, refer to FIG. 10. The process includes the following steps: Step 1010: Recursive cutting in a horizontal direction and a vertical direction. Step 1020: Establish a binary tree during cutting. Step 1030: Perform depth traversing for the binary tree to obtain a reading sequence. The description is made with reference to FIG. 11. As shown in FIG. 11, recursive cutting is performed for an image 1110, to obtain an image layout 1111, an image layout 1112, an image layout 1113, an image layout 1114, an image layout 1115, an image layout 1116, an image layout 1117, an image Layout 1118, an image layout 1119. A binary tree 1120 is established during the cutting, and depth traversing is performed for the binary tree 1120 obtain a reading sequence: the image layout 1111, the image layout 1112, the image layout 1113, the image layout 1114, the image layout 1115, the image layout 1116, the image layout 1117, the image layout 1118, and the image layout 1119.

In some embodiments, when the image layouts are relatively complex, such as when there are intersecting layouts, overlapping layouts, and L-shaped layouts, it may also be implemented in the above manner.

Figure 12:
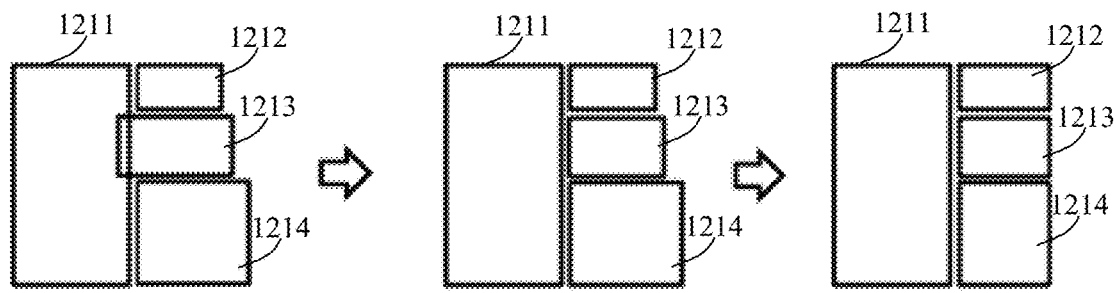
FIG. 12 is a schematic diagram of an interface content adjustment method provided in the method for determining a reading sequence shown in FIG. 10.

For the intersecting layouts, refer to FIG. 12. In the image layout 1211, the image layout 1212, the image layout 1213, and the image layout 1214, if the image layout 1211 and the image layout 1213 intersect each other, the image layout 1212, the image layout 1213, and the image layout 1214 are adjusted. After left edges are adjusted to be aligned, widths of the image layout 1212, the image layout 1213, and the image layout 1214 are adjusted to be consistent.

Figure 13:
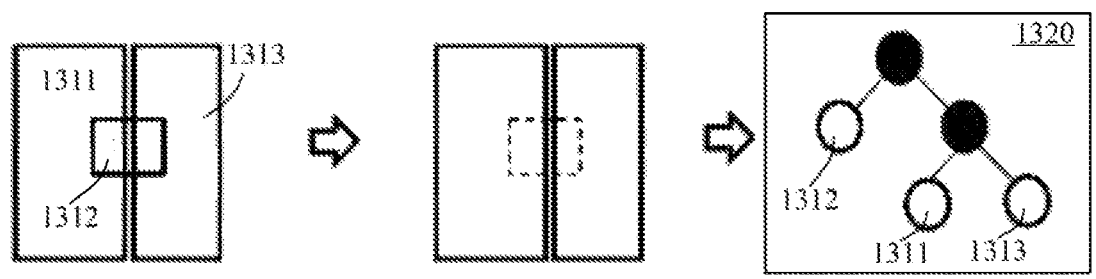
FIG. 13 is another schematic diagram of a correspondence between interface content and a binary graph provided in the method for determining a reading sequence shown in FIG. 10.

For the overlapping layouts, refer to FIG. 13. In the image layout 1311, the image layout 1312, and the image layout 1313, the image layout 1312 is overlapped on the image layout 1311 and the image layout 1313, and a constructed binary tree 1320 is shown in FIG. 13. A reading sequence obtained by performing depth traversing for the binary tree 1320 is: the image layout 1312, the image layout 1311, and the image layout 1313.

Figure 14:
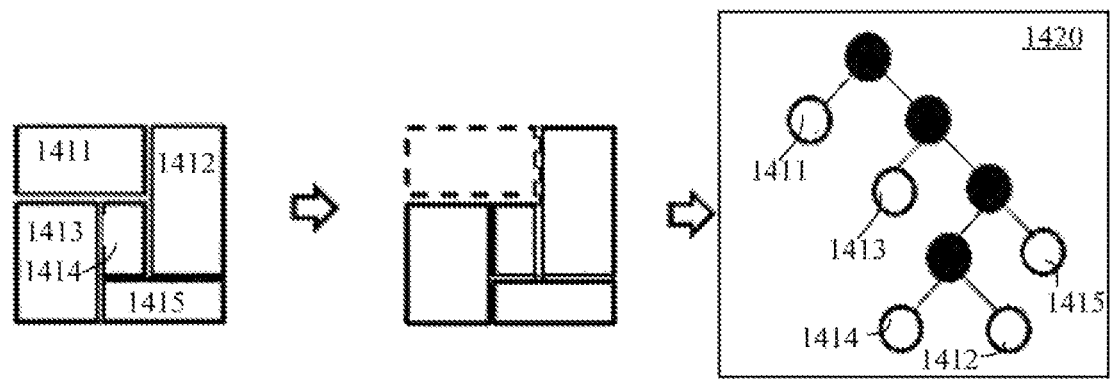
FIG. 14 is another schematic diagram of a correspondence between interface content and a binary graph provided in the method for determining a reading sequence shown in FIG. 10.

For the L-shaped layouts, refer to FIG. 14. The image layout 1411, the image layout 1412, the image layout 1413, the image layout 1414, and the image layout 1415 are arranged in an L-shape. The image layout 1411 is used as a starting position for reading, and a constructed binary tree 1420 is shown in FIG. 14. A reading sequence obtained by performing depth traversing on the binary tree 1420 is: the image layout 1411, the image layout 1413, the image layout 1414, the image layout 1412, and the image layout 1415.

Figure 15:
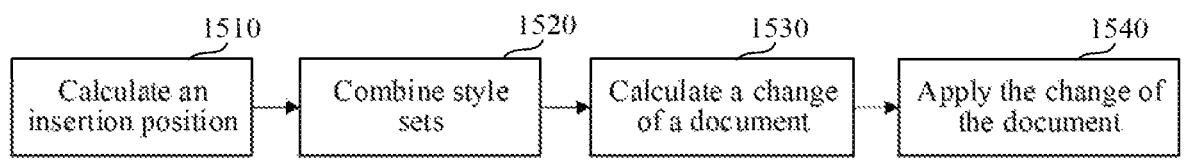
FIG. 15 is a flowchart of a document content insertion method according to the embodiments shown in FIG. 3.

In some embodiments, when adding the converted content corresponding to n image layouts to the electronic document, the electronic document may be an initial document. That is, the electronic document may be a document on which no format editing has been performed. A format of the document may be a default format. The electronic document may alternatively be an existing document, that is, a document oh which format editing has been performed. For a process of adding the converted content to the electronic document, refer to FIG. 15. As shown in FIG. 15, the process of adding the converted content includes the following steps:

In step 1510, an insertion position is calculated.

That is, a current position at which a cursor is located in the electronic document is determined, and the insertion position of the converted content is determined according to the position at which the cursor is located.

In step 1520, style sets are combined.

That is, a style set of the converted content corresponding to the n image layouts is combined into a style set of the electronic document.

In step 1530, a change of a document is calculated.

A change of a data structure of the document is calculated according to text, a style, a text length, and the insertion position of the converted content.

In step 1540, the change of the document is applied.

That is, the change of a data structure is applied to the electronic document, and the addition of the converted content is completed.

Based on the above, in the method of image-to-document conversion based on OCR provided in this embodiment, layout segmentation is performed for a to-be-converted image by using image content in the to-be-converted image, to segment the to-be-converted image into n image layouts respectively corresponding to types of content. Image content in the image layouts is processed for content types of the image layouts, thereby implementing recognition processing for different types of content in the to-be-converted image in different manners, and avoiding a problem that a format in a document after conversion is disordered because only text in the to-be-converted image can be recognized, and a large quantity of resources need to be consumed for organizing typesetting of the document by a user, causing relatively low document recognition efficiency, and improving conversion accuracy in image-to-document conversion.

In the method provided in this embodiment, in the image framing process, the OpenCV algorithm and the deep learning algorithm are combined and applied. Detection of framed edges by using the OpenCV algorithm is relatively fine and has a relatively good edge fitting effect, and detection of the framed edges by using the deep learning algorithm has relatively good adaptability, thereby improving accuracy of framed edge detection.

In the method provided in this embodiment, the distorted image is rectified to avoid affecting the OCR recognition process and the subsequent layout segmentation process because the document is in a deformed state such as being folded or being bent, thereby improving accuracy of image-to-document conversion.

Figure 16:
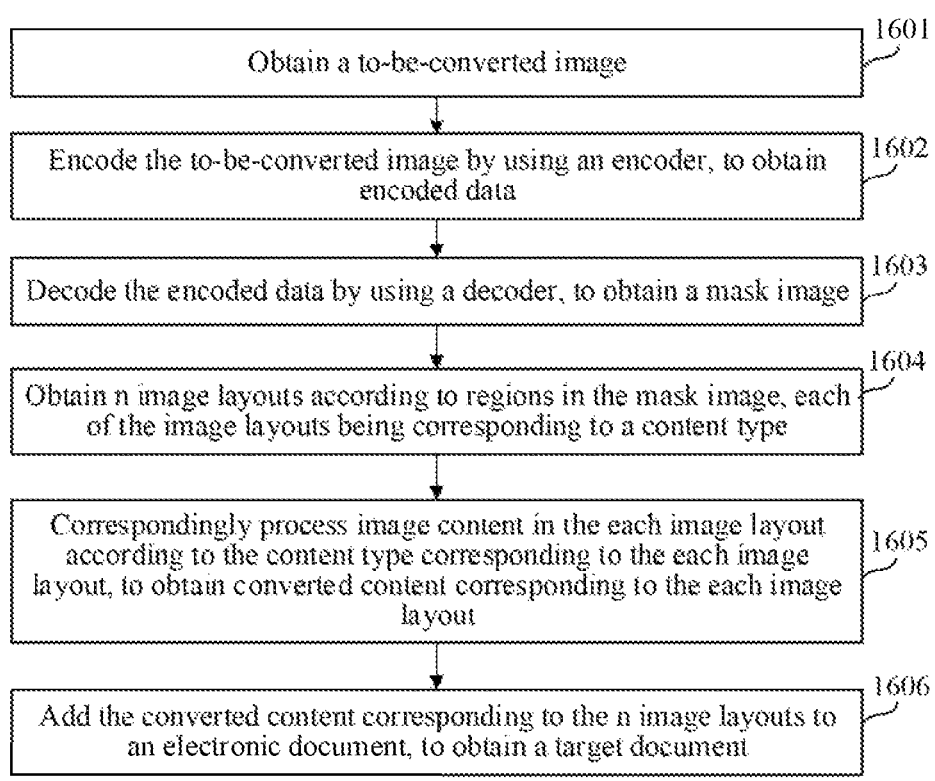
FIG. 16 is a flowchart of a method of image-to-document conversion based on OCR according to some other exemplary embodiments of this application.

In some embodiments, layout segmentation needs to be performed by using an encoder and a decoder. FIG. 16 is a flowchart of a method of image-to-document conversion based on OCR according to some other exemplary embodiments of this application. The description is made by using an example in which the method is implemented in a server. As shown in FIG. 16, the method includes the following steps:

In step 1601, a to-be-converted image is obtained.

In some embodiments, the to-be-converted image is an image whose image content is to be converted into a target document.

In some embodiments, the to-be-converted image is a pre-processed image, and manners of pre-processing include at least one of image framing and image rectification.

In some embodiments, a specific manner of obtaining the to-be-converted image has been described in detail in step 301 above, and details are not described herein again.

In step 1602, the to-be-converted image is encoded by using an encoder, to obtain encoded data.

In some embodiments, the encoder is configured to classify regions corresponding to different content types in the to-be-converted image through semantic analysis. In some embodiments, each classified region corresponds to one type of semantics, and each type of semantics corresponds to one content type. That is, each classified region corresponds to one content type.

In some embodiments, the encoder encodes the to-be-converted image through downsampling, thereby losing a relatively large amount of edge detail information, and the definition of the recognized region contour is relatively low, so that the decoder is used for decoding.

In step 1603, the encoded data is decoded by using a decoder, to obtain a mask image.

In some embodiments, the mask image is used for identifying regions of different content types in different expression manners.

In some embodiments, the decoder is configured to upsample an image having been encoded by the encoder, to obtain a mask image.

Figure 17:
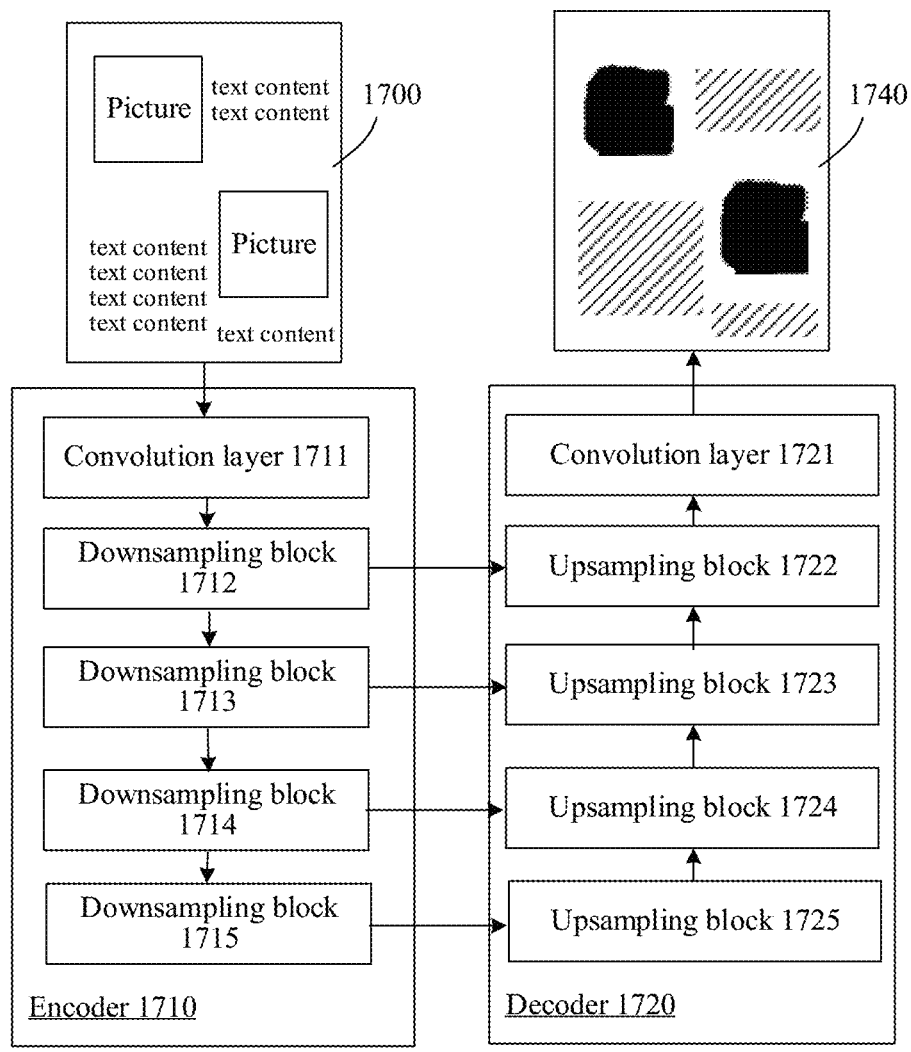
FIG. 17 is a schematic diagram of a manner of determining an image layout according to the embodiments shown in FIG. 16.

In some embodiments, FIG. 17 shows the encoding process of the encoder and the decoding process of the decoder. As shown in FIG. 17, a to-be-converted image 1700 is inputted to an encoder 1710, and the encoder 1710 downsamples the to-be-converted image 1700 by using a convolution (Conv) layer 1711, a downsampling block 1712, a downsampling block 1713, a downsampling block 1714, and a downsampling block 1715 respectively, and outputs encoded data. The encoded data is inputted to and upsampled by a convolution layer 1721, an upsampling block 1722, an upsampling block 1723, an upsampling block 1724, and an upsampling block 1725 in the decoder 1720 respectively, to obtain a mask image 1740. In some embodiments, the downsampling block 1712, the downsampling block 1713, the downsampling block 1714, and the downsampling block 1715 include a plurality of convolutions. The upsampling block 1722, the upsampling block 1723, the upsampling block 1724, and the upsampling block 1725 also include a plurality of convolutions.

In some embodiments, the encoder and the decoder are an encoder and a decoder obtained after training. In some embodiments, in the training process of the encoder and decoder, a multi-scale loss function is introduced. After a training sample is processed by using the encoder and the decoder, the mask image is obtained. A loss value at an original image resolution, a loss value at ¼ original image resolution, and a loss value at ¹⁄₁₆ original image resolution are calculated by the loss function. The three loss values are combined as a final loss value to train the encoder and decoder. In some embodiments, the loss function is an intersection over union (IOU) function.

In step 1604, n image layouts are obtained according to regions in the mask image, each of the image layouts corresponding to a content type.

In some embodiments, correction processing is performed for the regions in the mask image, to obtain the n image layouts.

In some embodiments, the correction processing including at least one of denoising processing, combination processing, and intersection position cutting processing.

The denoising processing includes filtering out regions in the mask image whose areas are smaller than a preset area, the combination processing includes combining consecutive regions belonging to the same content type, and the intersection position cutting processing includes performing separation and cutting for regions that intersect each other.

In some embodiments, in the process of denoising processing, a minimum circumscribed region of each region is first determined according to a computer vision (CV) algorithm, and then some regions whose areas are smaller than a preset area or included in the minimum circumscribed regions are filtered out according to a filtering rule.

In some embodiments, after the regions in the mask image are corrected, when n image layouts are obtained according to the corrected mask image, any of the following situations is included.

In one case, the mask image does not include a single-column splitter bar, then a rectangular box corresponding to each of the regions in the mask image is generated, as the n image layouts, where each rectangular box is an image layout.

In another case, the mask image includes a single-column splitter bar, and the corrected mask image is split according to the single-column splitter bar to obtain at least two split mask images. Regions in each of the at least two split mask images are corrected, to generate matrices corresponding to the corrected regions in each of the at least two split mask images, as n image layouts. The correction of each split mask image includes performing OCR recognition for each split mask image, and splitting split mask images with text intersecting content. For example, a last column of text in a split mask image 1 intersects with a first column of text in a split mask image 2, then the last column of text in the split mask image 1 is segmented.

Figure 18:
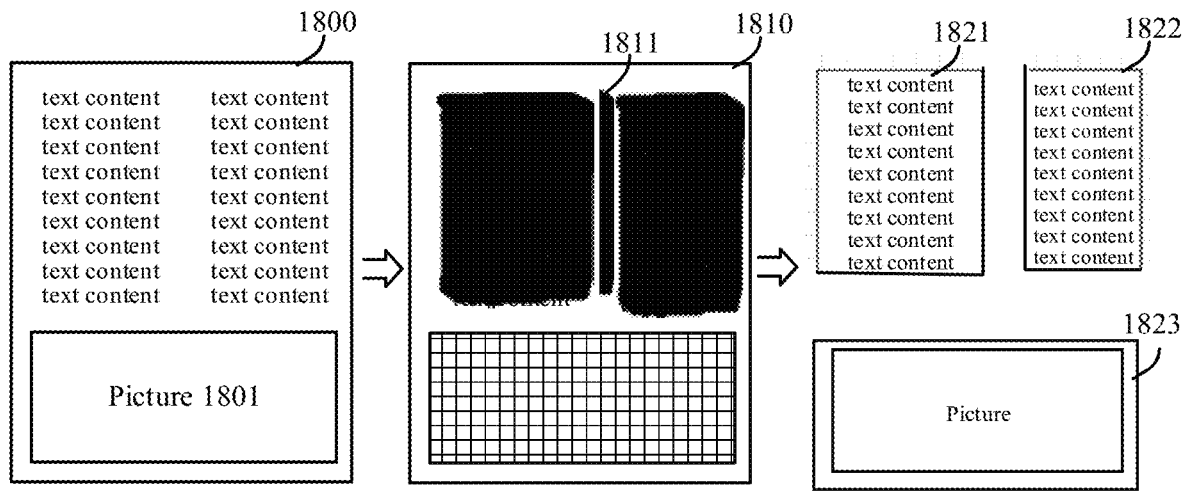
FIG. 18 is a schematic diagram of an image segmentation manner according to the embodiments shown in FIG. 16.

For example, FIG. 18 is a schematic diagram of a layout cutting process according to this embodiment. As shown in FIG. 18, the mask image 1810 generated corresponding to the to-be-converted image 1800 includes a single-column splitter bar 1811. The to-be-converted image 1800 is split according to the single-column splitter bar 1811, to obtain a split mask image 1821, a split mask image 1822, and a split mask image 1823. Since the single-column splitter bar 1811 is vertically downward, and the bottom is above a picture 1801, splitting is horizontally performed on the picture 1801.

Figure 19:
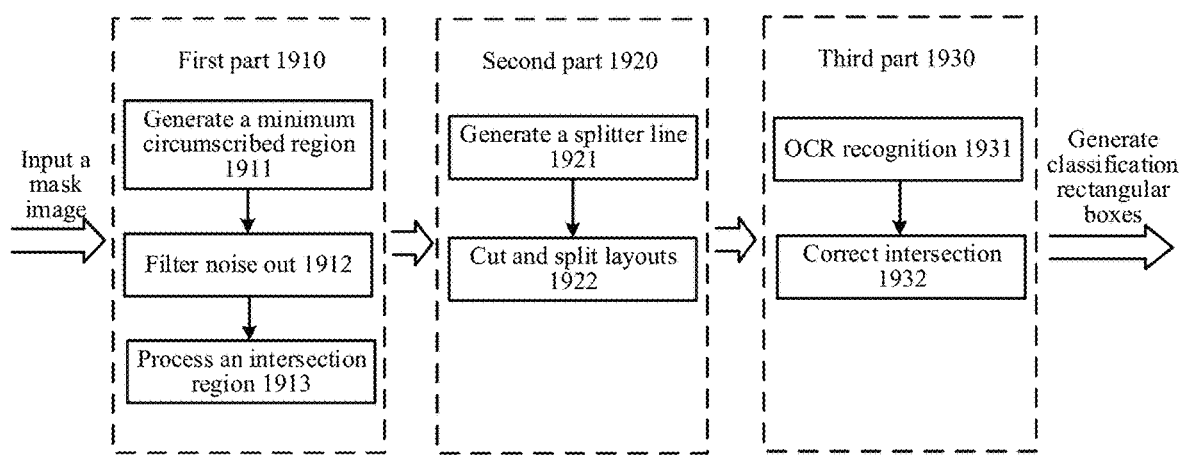
FIG. 19 is a schematic diagram of a manner of determining an image layout according to the embodiments shown in FIG. 16.

For example, FIG. 19 shows the above process of correcting the mask image and generating the n image layouts. As shown in FIG. 19, the process includes a first part 1910, a second part 1920, and a third part 1930. In the first part 1910, the following operations are sequentially performed for the mask image: generating a minimum circumscribed area 1911, filtering a noise 1912, and processing an intersection area 1913. In the second part 1920, the following operations are performed for the mask image processed in the first part: generating a splitter line 1921, and cutting and segmenting a layout 1922. In the third part 1930, the following operations are performed for the mask image processed in the second part: performing OCR recognition 1931, and correcting intersection 1932. After the third part 1930 is processed, classification rectangular boxes are generated according to the regions in the mask image, each of the classification rectangular boxes being corresponding to one content type, and n image layouts are obtained, each of the layouts being corresponding to one content type.

Figure 20:
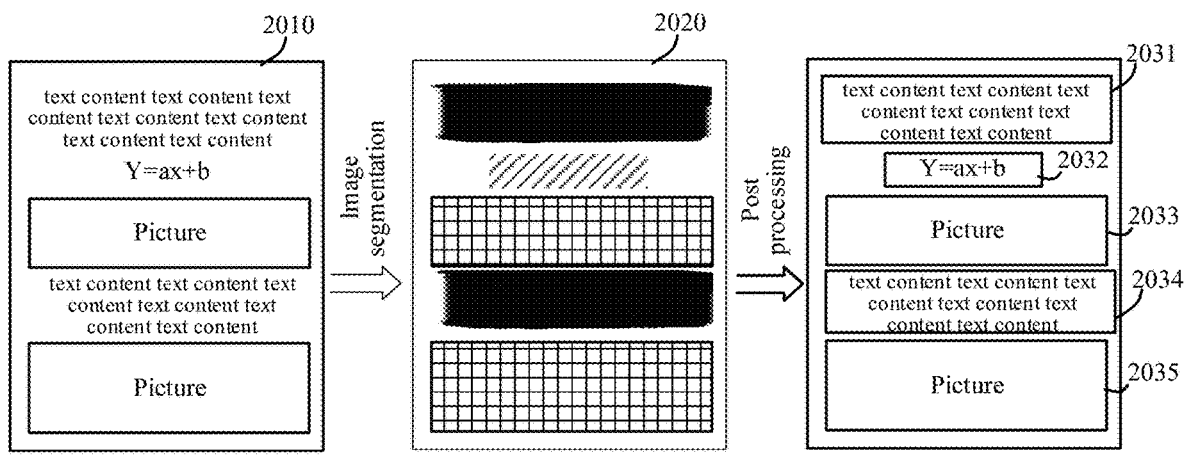
FIG. 20 is a schematic diagram of a manner of determining an image layout according to the embodiments shown in FIG. 16.

For example, a process of converting the to-be-converted image into the mask image and generating the n image layouts from the mask image is shown in FIG. 20. After image segmentation is performed on a to-be-converted image 2010, a mask image 2020 is obtained. After post processing is performed for the mask image 2020, five rectangular boxes: a rectangular box 2031, a rectangular box 2032, a rectangular box 2033, a rectangular box 2034, and a rectangular box 2035 are obtained as image layouts.

In step 1605, image content is processed in the each image layout (the respective image layout) according to the content type corresponding to the each image layout (the respective image layout), to obtain converted content corresponding to the each image layout (the respective image layout).

In some embodiments, for a different content type corresponding to an image layout, a manner of processing image content is also different. For example, for the text type of content, OCR recognition need to be performed for the image layout; for the table type of content, processing such as table border recognition and OCR recognition need to be performed for the image layout; for the picture type of content, picture cropping processing needs to be performed for the image layout; and for the formula type of content, picture cropping processing may also be performed for the image layout.

In step 1606, the converted content corresponding to the n image layouts is added to an electronic document, to obtain a target document.

In some embodiments, the process of adding the converted content to the electronic document has been described in detail in the foregoing step 304, and details are not described herein again.

In some embodiments, the user can preview the target document, and preview manners include any of the following manners.

In one manner, the server sends the converted content (plain text, a text style, a style set) to the terminal. After the user determines a plain text recognition result, a text style recognition result, and the style set, the server adds the converted content to the electronic document, and sends the target document to the terminal.

In another manner, after adding the converted content to the electronic document to obtain the target document, the server sends a preview image of the target document to the terminal. The user may preview the target document by using the terminal and may select to upload an image again for conversion or confirm the converted result according to a preview result. When the user selects to confirm the conversion result, the server sends document content of the target document to the terminal.

Based on the above, in the method provided in this embodiment, the mask image is determined by using the encoder and the decoder, and n image layouts are determined according to the mask image. An analysis capability of the encoder for semantic information is used to determine the image layouts, to implement a conversion manner in which different processing is performed for image layouts of different content types, thereby improving accuracy of image-to-document conversion.

Figure 21:
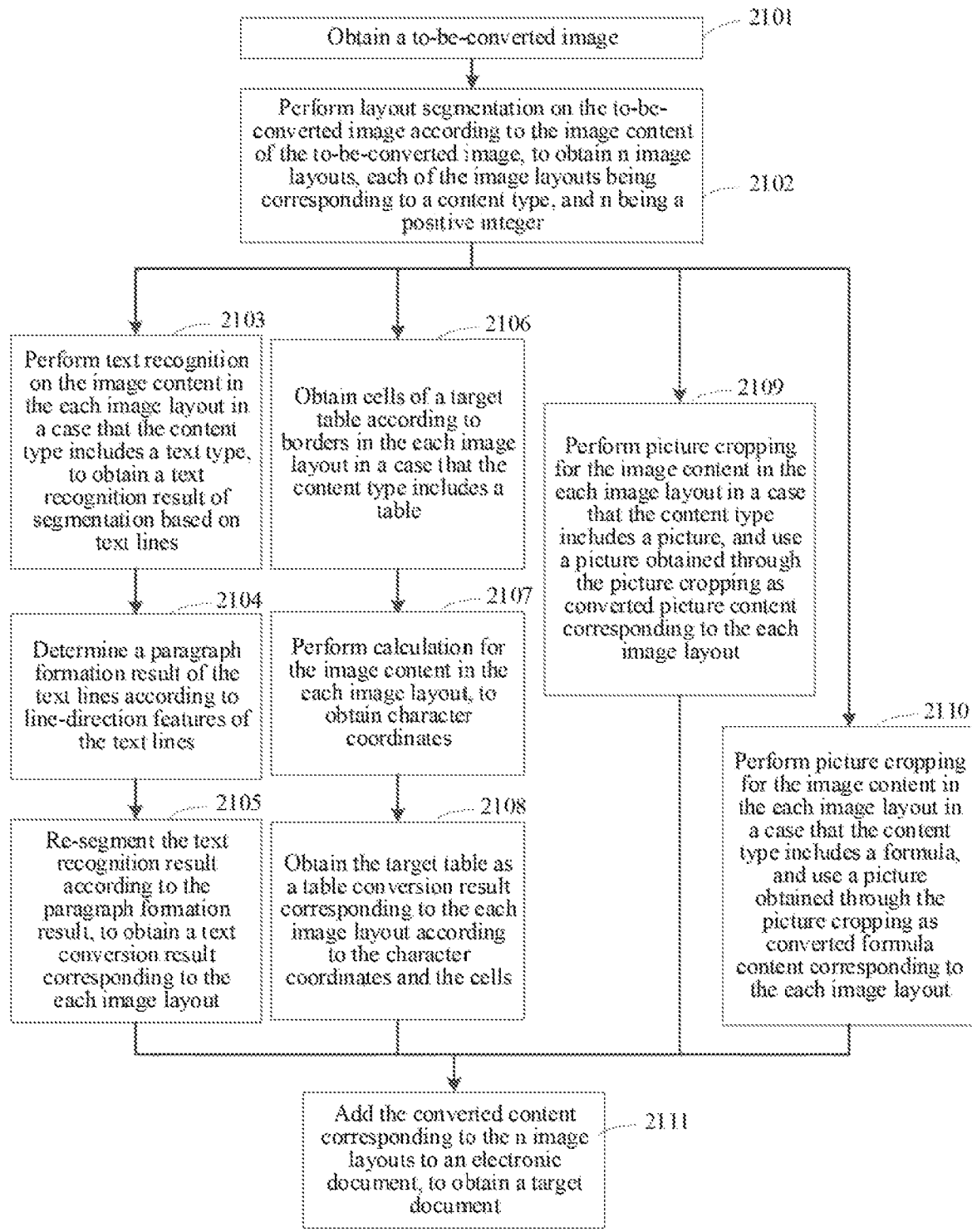
FIG. 21 is a flowchart of a method of image-to-document conversion based on OCR according to some other exemplary embodiments of this application.

In some embodiments, the content type includes at least one of text, a table, a picture, and a formula. FIG. 21 is a flowchart of a method of image-to-document conversion based on OCR according to some other exemplary embodiments of this application. The description is made with reference to an example in which the method is applied to a server. As shown in FIG. 21, the method includes the following steps:

In step 2101, a to-be-converted image is obtained.

In some embodiments, the to-be converted image is an image whose image content is to be converted into a target document.

In some embodiments, the to-be-converted image is a pre-processed image, and manners of pre-processing include at least one of image framing and image rectification.

In some embodiments, a specific manner of obtaining the to-be-converted image has been described in detail in step 301 above, and details are not described herein again.

In step 2102, layout segmentation is performed on the to-be-converted image according to the image content of the to-be-converted image, to obtain n image layouts, each of the image layouts being corresponding to a content type, and n being a positive integer.

In some embodiments, each of the image layouts obtained through segmentation corresponds to a content type, the content type including at least one of: text, a table, a picture, a page number, a header and a footer, and a formula.

In some embodiments, each of the image layouts corresponds to a type identifier, the type identifier being used for representing a content type corresponding to the each image layout.

In some embodiments, the layout segmentation process is described in detail in step 1602 to step 1604, and details are not described herein again.

In step 2103, text recognition is performed on the image content in the each image layout (the respective image layout) in response to a determination that the content type includes a text type, to obtain a text recognition result of segmentation based on text lines.

In some embodiments, the text recognition result of segmentation based on text lines means that in image content of the image layout, each row of recognized text is used as a paragraph of text in the text recognition result. The text recognition result obtained through the recognition has relatively poor readability and does not conform to the original paragraph formation manner in the image content of the image layout.

In step 2104, a paragraph formation result of the text lines is determined according to line-direction features of the text lines.

In some embodiments, the paragraph formation result is used for representing a segmentation manner for the text recognition result.

In some embodiments, the line-direction feature includes at least one of a line height and a line spacing. In some embodiments, in the process of determining the paragraph formation result according to the line-direction features, a histogram is first generated according to the line-direction features of the text lines; a threshold corresponding to the line-direction features is set according to a distribution of the line-direction features in the histogram; and a text line is determined as a paragraph formation line in response to a determination that the line-direction feature of the text line reaches the threshold, the paragraph formation line being used for representing that the text line being a beginning or an end of a paragraph.

For example, when the line-direction feature is a line height, a line height histogram is generated according to line heights, and a line height threshold is set according to a distribution of the line heights in the histogram. For example, if 80% of the line heights in the histogram is below 5, the line height threshold is set to 5. When a line height is higher than 5, a text line is determined as a paragraph formation line, a first paragraph formation line is determined as a beginning of a paragraph, and then a second paragraph formation line is determined as an end of the paragraph. By analogy, beginnings and ends of paragraphs are arranged to be spaced apart in a consecutive manner. The line height may alternatively be implemented as a line spacing. In some embodiments, paragraph formation lines may be determined according to the line height and the line spacing.

Figure 22:
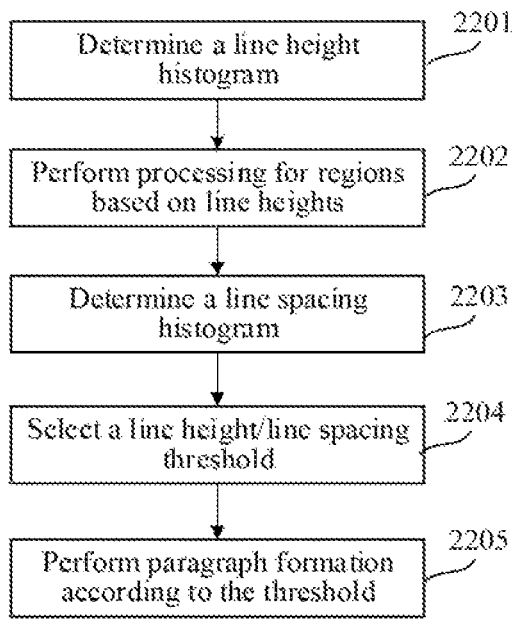
FIG. 22 is a flowchart of a paragraph formation manner according to the embodiments shown in FIG. 21.
Figure 23:
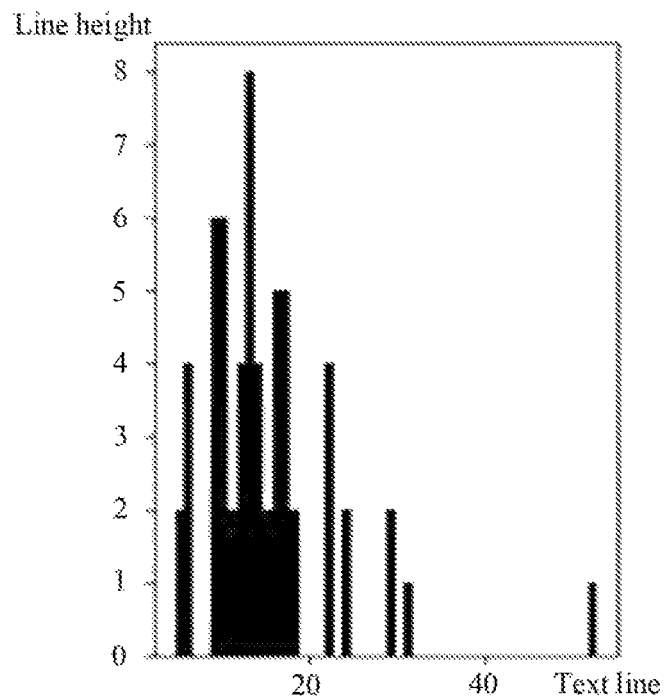
FIG. 23 is a histogram of line heights provided in the paragraph formation manner shown in FIG. 22.
Figure 24:
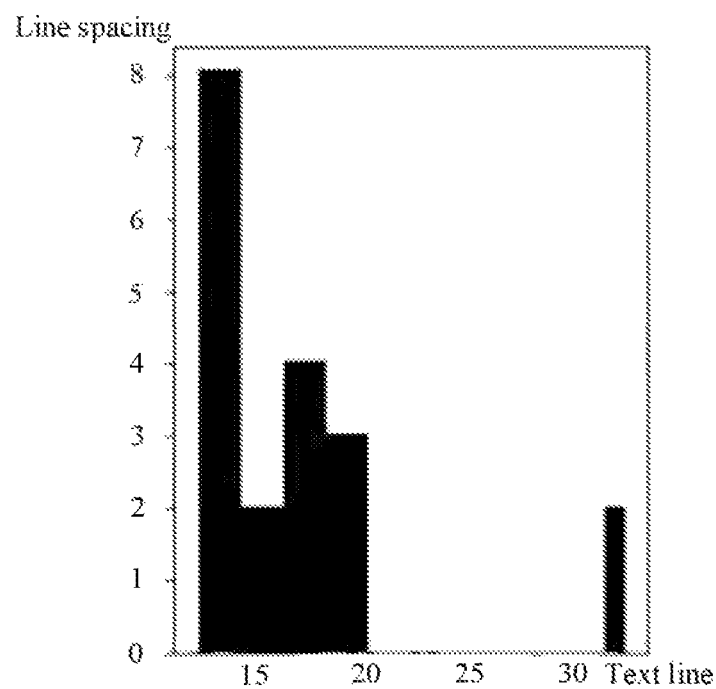
FIG. 24 is a histogram of line spacings provided in the paragraph formation manner shown in FIG. 22.

For example, referring to FIG. 22, the process of determining the paragraph formation lines according to the line height and the line spacing is as follows:

In step 2201, a line height histogram is determined. In some embodiments, refer to FIG. 23 for an example of the line height histogram. As shown in FIG. 23, more than half of line heights are below a line height of 4. In step 2202, processing for regions based on line heights is performed. That is, a position of a paragraph corresponding to each line height range is determined. In step 2203, a line spacing histogram is determined. In some embodiments, FIG. 24 shows an example of the line spacing histogram. As shown in FIG. 24, more than half of line spacings are below a line spacing of 4. In step 2204, a line height/line spacing threshold is selected. In some embodiments, with reference to the line height histogram shown in FIG. 23 and the line spacing histogram shown in FIG. 24, the line height of 4 and the line spacing of 4 may be set as thresholds. In step 2205, paragraph formation is performed according to the threshold. When a line height reaches the threshold and/or a line spacing reaches the threshold, a text line is determined as a paragraph formation line.

In step 2105, the text recognition result is res-segmented according to the paragraph formation result, to obtain a text conversion result corresponding to the each image layout (the respective image layout).

Figure 25:
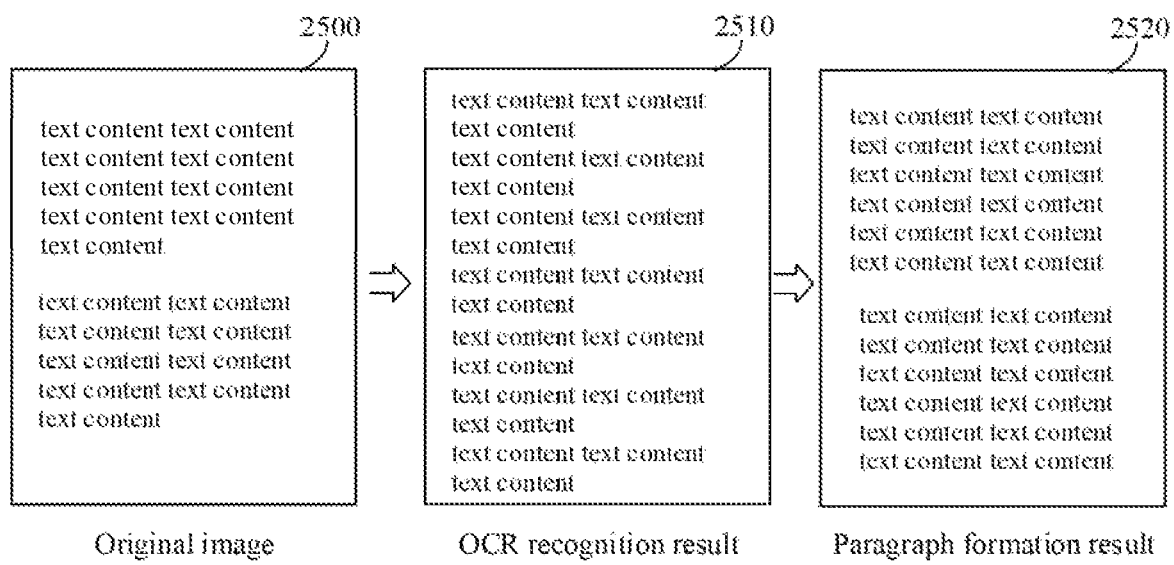
FIG. 25 is a schematic diagram of a paragraph formation result provided in the paragraph formation manner shown in FIG. 22.

In some embodiments, the text recognition result is re-segmented according to text lines determined as paragraph formation lines. Refer to FIG. 25 as an example of the paragraph formation result. As shown in FIG. 25, after OCR recognition is performed on an image 2500, a text recognition result 2510 is obtained. In the text recognition result 2510, each line of text in the image 2500 is used as a paragraph of text to generate a recognition result. After paragraph formation is performed for the text recognition result 2510, a paragraph formation result 2520 is obtained. A paragraph formation manner of the paragraph formation result 2520 is consistent with a paragraph formation manner of text in the image 2500.

Figure 26:
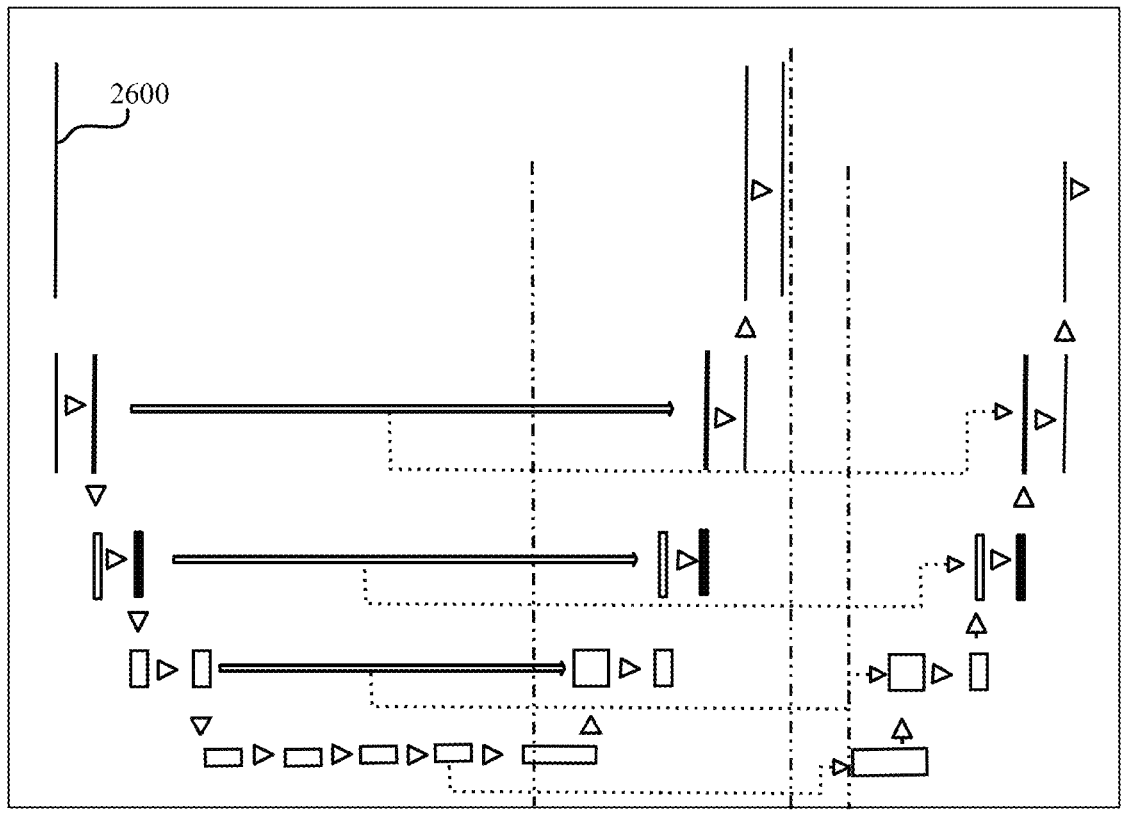
FIG. 26 is a schematic diagram of a font recognition process according to the embodiments shown in FIG. 21.

In some embodiments, the process of text recognition further includes recognizing a font. In some embodiments, the font includes at least one of a font attribute and a font family. The font attribute includes at least one of bold, underline, and italic; the font family is used for representing the font expression form, such as KaiTi, SongTi, and HeiTi. For font recognition, a dual-branch multi-task network is designed. The font attribute is recognized first, and then the font family is recognized. The font attribute recognition branch and the font family recognition branch share an image encoding layer. For example, referring to FIG. 26, when recognizing text through the Unet network, the font attribute is determined by downsampling and upsampling an image feature 2600, and the font family is determined according to the features in the sampling process.

In step 2106, cells of a target table are obtained according to borders in the each image layout (the respective image layout) in response to a determination that the content type includes a table.

In some embodiments, horizontal borders and vertical borders may be determined according to the borders in the each image layout (the respective image layout), and intersections between the horizontal borders and the vertical borders are determined. The cells of the target table are obtained according to the horizontal borders, the vertical borders, and the intersections between the horizontal borders and the vertical borders. In some embodiments, the horizontal borders and the vertical borders may be obtained by correcting the borders in the each image layout to a horizontal direction or a vertical direction.

In some embodiments, the borders in the each image layout (the respective image layout) further need to be recognized before the borders are corrected. First, pixel level segmentation and marking are performed for the each image layout by using a neural network, and there are two pieces of output content for each pixel. The two pieces of output content are: a probability of belonging to horizontal borders and a probability of belonging to vertical borders. According to a pixel-level segmentation result, geometric analysis is performed for the segmentation result, connected regions of a horizontal segmentation image and a vertical segmentation image are extracted, and pixels of the connected regions are fitted into a polyline. That is, several line segments are fitted, two coordinates of a starting point and an end of the line segment are used for identification, polylines are combined, and polylines belonging to the same border are combined according to similarities between inclination angles and distances between segments of the polylines. A border obtained through the combination is corrected to the horizontal direction or the vertical direction.

In step 2107, calculation is performed for the image content in the each image layout (the respective image layout), to obtain character coordinates.

In some embodiments, with reference to step 2106, the horizontal borders and the vertical borders are obtained by correcting the borders in the each image layout (the respective image layout) to a horizontal direction or a vertical direction, to correct the each image layout (the respective image layout). Since distortion of the horizontal borders and the vertical borders is related to the distortion of the each image layout, by correcting the horizontal borders and the vertical borders, the overall correction of the each image layout can be realized simultaneously.

In some embodiments, after OCR calculation is performed for the image content in the corrected image layout, the character coordinates are obtained. In some embodiments, character recognition content corresponding to the character coordinates is further obtained through OCR calculation.

In some embodiments, after OCR calculation is performed on the image content in the corrected image layout, text box coordinates may further be obtained, and a text box is converted into horizontal borders or vertical borders according to the text box coordinates, to supplement missing borders in the pixel segmentation result.

In step 2108, the target table is obtained as a table conversion result corresponding to the each image layout (the respective image layout) according to the character coordinates and the cells.

In some embodiments, information of each cell is integrated to obtain a height of each row, a width of each column, and a combination relationship between cells. An expression manner of the combination relationship between cells is: (a cell number in an upper left corner, a cell number in a lower right corner), that is, cells between the cell number in the upper left corner and the cell number in the lower right corner are combined into a whole cell. For example, an expression manner of the combination relationship between cells is (5, 10), then cells between a cell numbered 5 and a cell numbered 10 are combined, where the cells between the cell numbered 5 and the cell numbered 10 are cells framed from an upper left corner of the cell numbered 5 and a lower right corner of the cell numbered 10, instead of cells numbered between 5 to 10.

In some embodiments, after cell information is integrated, a font size in each cell is calculated based on a ratio of a size of the cell to a size of the entire table, and an alignment manner is deduced according to the placement positions of text in cells.

Figure 27:
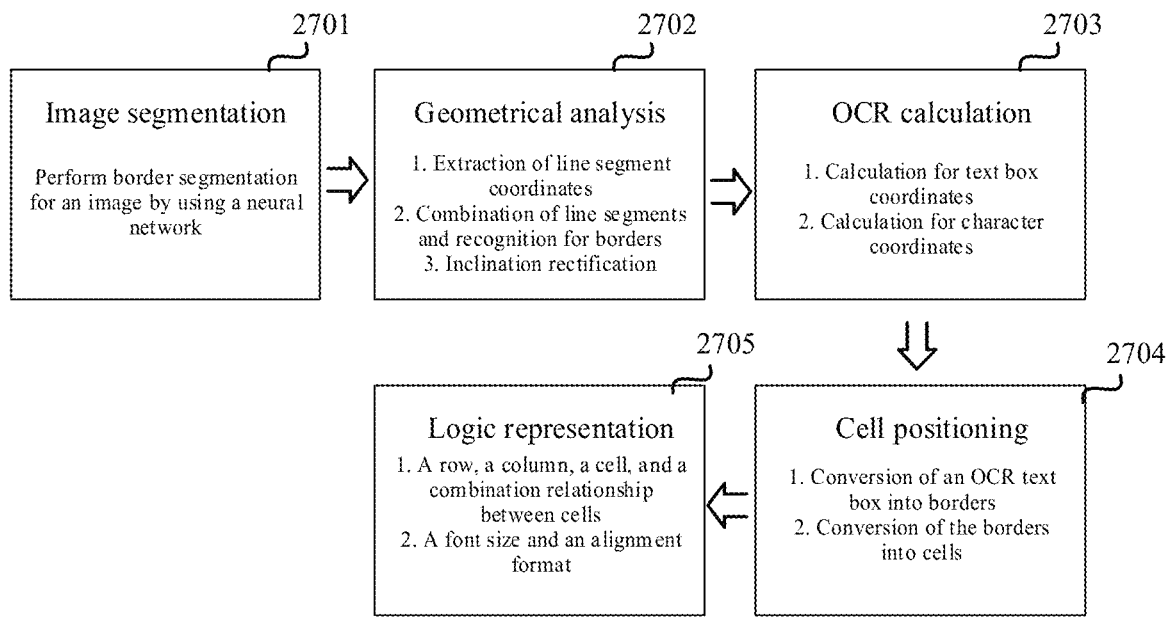
FIG. 27 is a flowchart of a table recognition method according to the embodiments shown in FIG. 21.

In some embodiments, referring to FIG. 27 shows an example of a table processing process. The process includes the following steps: In step 2701, image segmentation is performed. The image segmentation process includes: performing border segmentation for an image by using a neural network. In step 2702, geometrical analysis is performed. The geometric analysis process includes: 1. Extraction of line segment coordinates; 2. Combination of line segments and recognition for borders; 3. Inclination rectification. In step 2703, OCR calculation is performed. A process of OCR calculation includes: 1. Calculation for text box coordinates; 2. Calculation for character coordinates. In step 2704, cell positioning is performed. The step includes: 1. Conversion of an OCR text box into borders; 2. Conversion of the borders into cells. In step 2705, logic representation is performed. The step includes: 1. A row, a column, a cell, and a combination relationship between cells; 2. A word size and an alignment format.

In step 2109, picture cropping is performed for the image content in the each image layout (the respective image layout) in response to a determination that the content type includes a picture, and use a picture obtained through the picture cropping as converted picture content corresponding to the each image layout (the respective image layout).

In step 2110, picture cropping is performed for the image content in the each image layout (the respective image layout) in response to a determination that the content type includes a formula, and use a picture obtained through the picture cropping as converted formula content corresponding to the each image layout (the respective image layout).

In step 2111, the converted content corresponding to the n image layouts is added to an electronic document, to obtain a target document.

In some embodiments, the process of adding the converted content to the electronic document has been described in detail in the foregoing step 304, and details are not described herein again.

Based on the above, in the method provided in this embodiment, image layouts of different content types are performed in different manners, such as: performing OCR recognition for text, performing table recognition for a table, performing picture cropping for a picture, and performing picture cropping for a formula, thereby avoiding the problem that the same processing manner cannot be used for recognizing a plurality of types of content, which causes a relatively poor conversion result.

Figure 28:
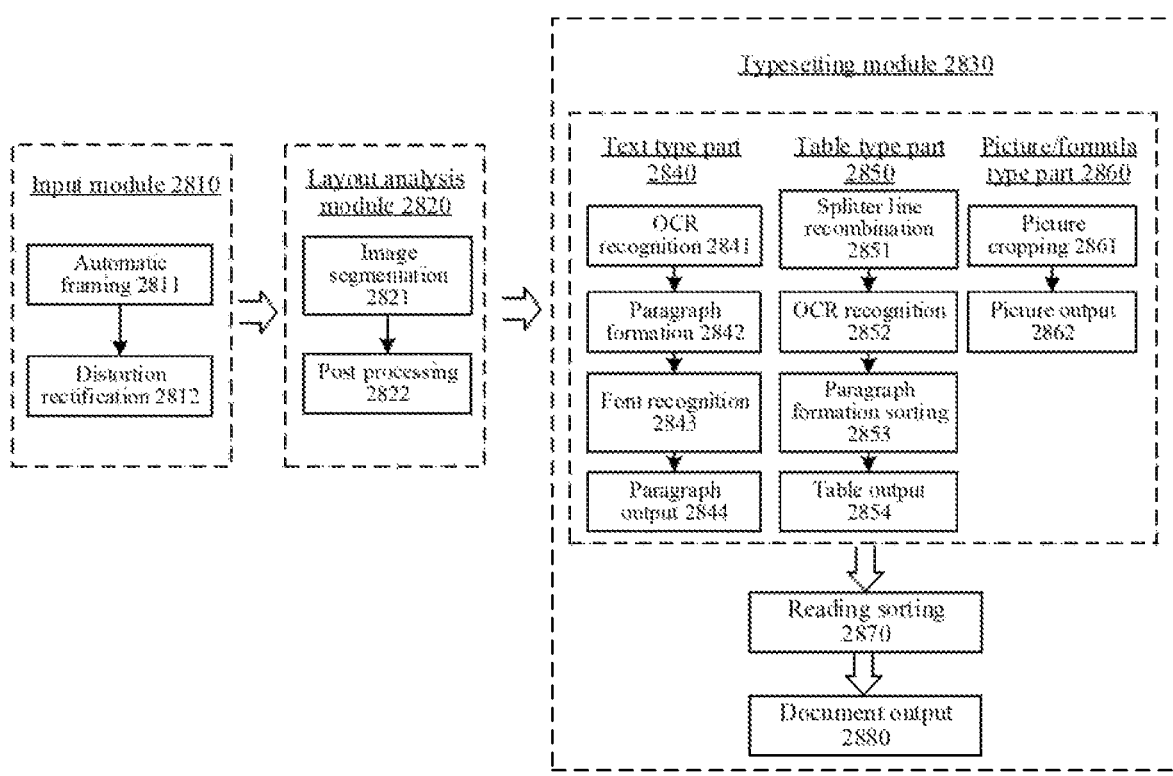
FIG. 28 is a schematic diagram of modules participating in conversion in a process of performing a method of image-to-document conversion based on OCR according to some exemplary embodiments of this application.

FIG. 28 is a schematic diagram of modules performing conversion in an image-to-document conversion process according to some exemplary embodiments of this application. As shown in FIG. 28, in a processing process of image-to-document conversion, an input module 2810, a layout analysis module 2820, and a typesetting module 2830 are involved. One or more of the modules (and other similar terms such as unit, submodule, etc.) mentioned in this disclosure (e.g., FIG. 28 and other figures) can be implemented by processing circuitry, software, or a combination thereof, for example. Each module can be implemented using one or more processors (or processors and memory). Likewise, a processor (or processors and memory) can be used to implement one or more modules. Moreover, each module can be part of an overall module that includes the functionalities of the module The input module 2810 includes automatic framing 2811 and distortion rectification 2812.

The automatic framing 2811 is to automatically frame a picture part that needs to be converted in the to-be-converted image, and remove unnecessary parts in the to-be-converted image, such as a margin part and a non-document content part.

The image rectification 2812 is to rectify an image having a distortion to a normal flat plane state. In an actual scenario, when a user photographs a document, the document may be in a deformation state such as being folded or being bent, and consequently affecting an OCR recognition process, and affecting a subsequent layout segmentation process. Therefore, the image needs to be rectified.

The layout analysis module 2820 includes image segmentation 2821 and post processing 2822.

The image segmentation 2821 means segmenting the image into regions corresponding to content types according to content types in the image, and each region corresponds to one content type.

The post processing 2822 means performing at least one of processing such as denoising processing, combination processing, and intersection position cutting processing on regions segmented through image segmentation 2821.

The typesetting module 2830 includes a text type part 2840, a table type part 2850, and a picture/formula type part 2860.

The processing of the text type part 2840 includes OCR recognition 2841, paragraph formation 2842, font recognition 2843, and paragraph output 2844.

The processing of the table type part 2850 includes splitter line recombination 2851, OCR recognition 2852, paragraph formation sorting 2853, and table output 2854.

The processing of the picture/formula type part 2860 includes the picture cropping 2861 and picture output 2862.

The typesetting module 2830 further needs to perform reading sorting for image layout through reading sorting 2870, and then performs document output 2880.

Figure 29:
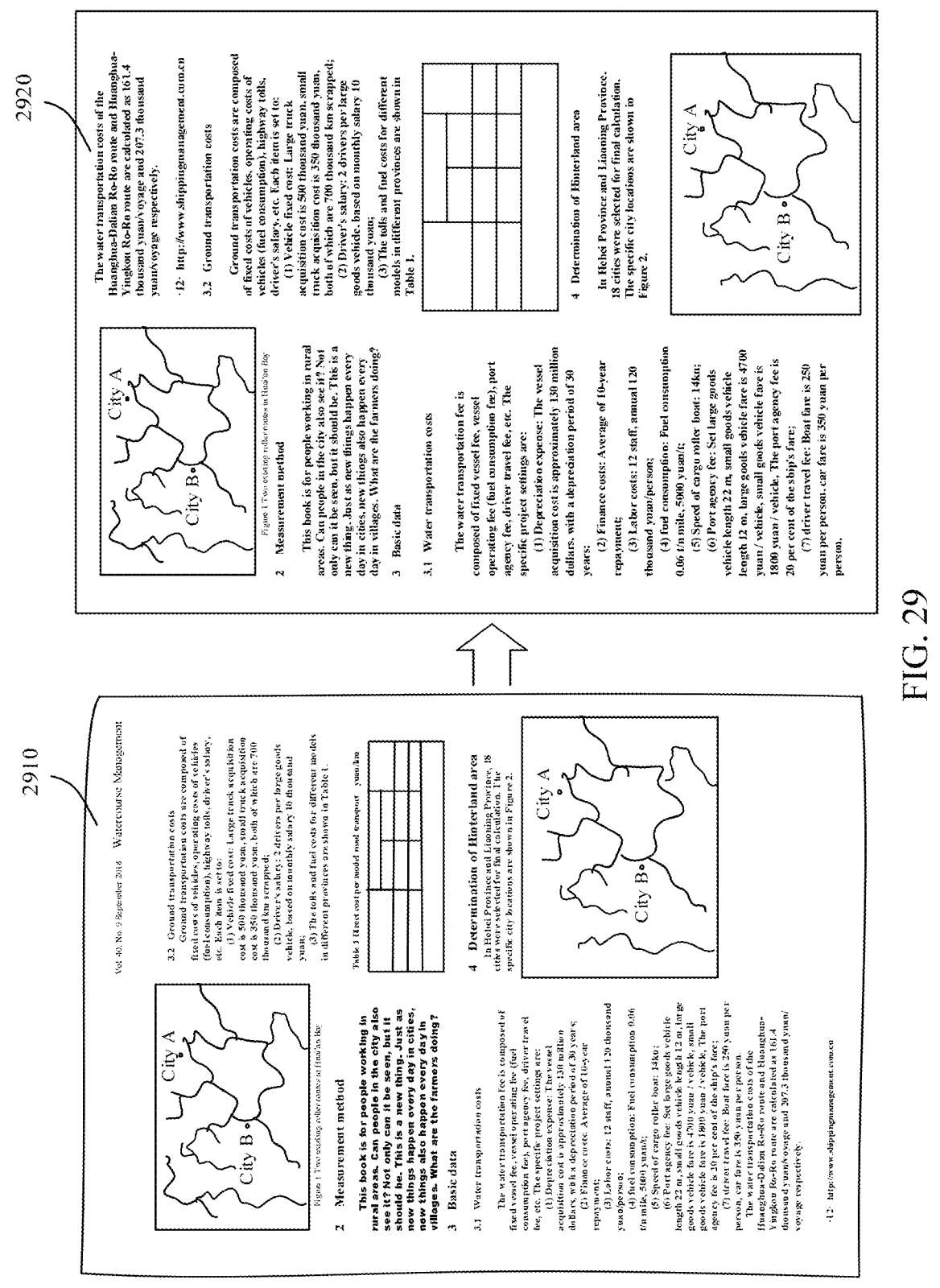

For example, a conversion result of the method of image-to-document conversion based on OCR provided in this embodiment of this application is shown in FIG. 29. After a to-be-converted image 2910 is converted, an electronic document 2920 is obtained.

Figure 30:
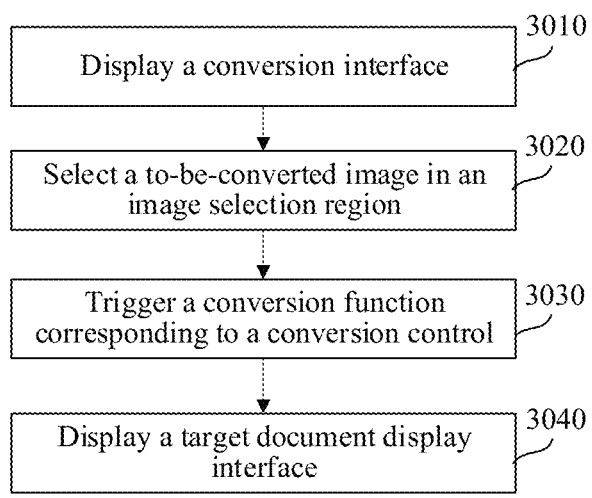
FIG. 30 is a flowchart of a method of image-to-document conversion based on OCR according to some other exemplary embodiments of this application.

FIG. 30 is a flowchart of a method of image-to-document conversion based on OCR according to some exemplary embodiments of this application. The method may be applied to a terminal. As shown in FIG. 30, the method includes the following steps:

In step 3010, a conversion interface is displayed.

In some embodiments, the conversion interface includes a conversion control and an image selection region, the image selection region being used for determining the to-be-converted image, and the conversion control being used for triggering the transmission of the to-be-converted image to the server for conversion.

In step 3020, a to-be-converted image is selected in an image selection region.

In some embodiments, the to-be-converted image may be an image acquired by an image acquisition device of the terminal, or may be an image stored in an album of the terminal.

In step 3030, a conversion function is triggered corresponding to a conversion control.

In some embodiments, the conversion function is used to convert an image into a document format. In some embodiments, during triggering of the conversion function corresponding to the conversion control, when the terminal is implemented as a mobile terminal including a touch display screen, the conversion function may be implemented by touching the conversion control. When the terminal is implemented as a portable laptop or desktop, the conversion control may be selected by using an external input device, such as a keyboard and a mouse.

In some embodiments, when the terminal triggers the conversion function, the terminal sends the to-be-converted image to the server, and the server converts the to-be-converted image into a target document. The process of recognizing and concerting text and typesetting in the to-be-converted image by the server has been described in detail in the foregoing embodiments, and details are not described herein again.

In step 3040, a target document display interface is displayed.

In some embodiments, the target document display interface includes the target document obtained after the to-be-converted image is converted, a typesetting manner of the target document corresponding to and consistent with that of the to-be-converted image. In some embodiments, a content type in a first target region of the target document is consistent with a content type in a second target region of the to-be-converted image, and a position of the first target region in the target document corresponds to a position of the second target region in the to-be-converted image. The content type includes at least one of text, a picture, a table, and a formula.

For example, refer to the electronic document 2920 in FIG. 29 for the conversion result of the target document.

Figure 31:
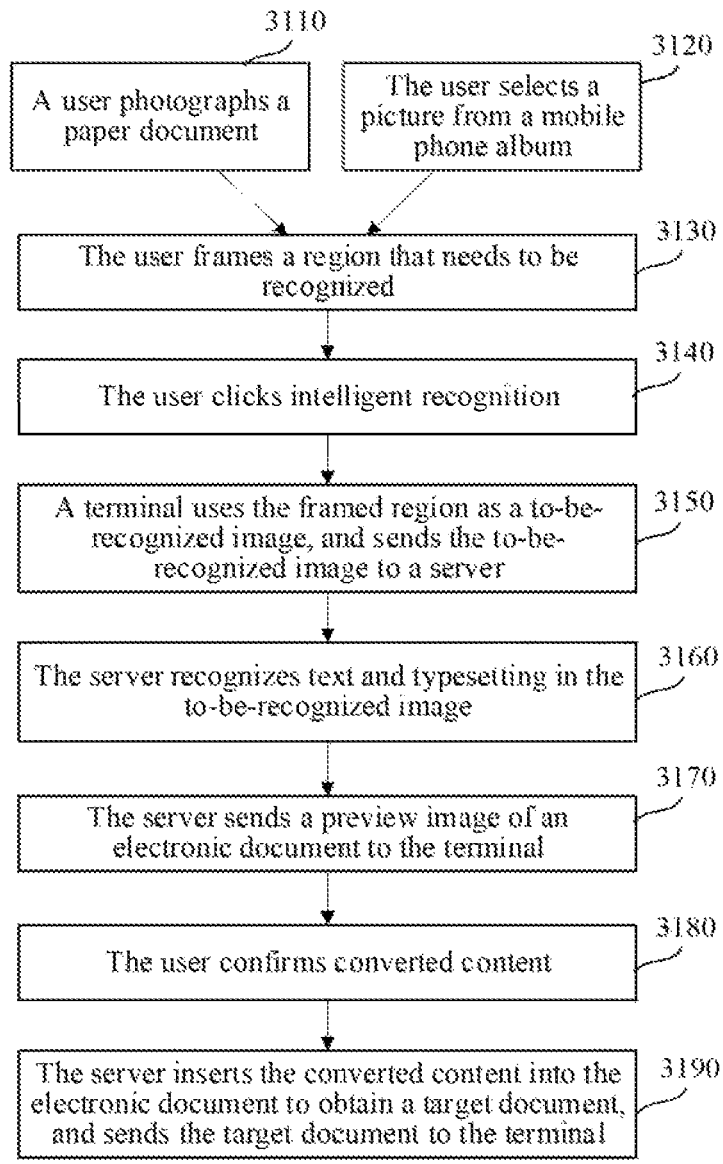
FIG. 31 is a flowchart of a method of image-to-document conversion based on OCR according to some other exemplary embodiments of this application.

In some embodiments, for the description of a process from determining the image by the user to receiving the document by the terminal in this application, refer to FIG. 31. The process includes the following steps:

In step 3110, a user photographs a paper document.

In some embodiments, the step can also be implemented as: a user photographs displayed content in an electronic display screen, such as photographing a mobile advertisement.

In step 3120, the user selects a picture from a mobile phone album.

In some embodiments, step 3110) and step 3120 are parallel steps, and only step 3110 may be executed, or only step 3120 may be executed.

In step 3130, the user frames a region that needs to be recognized.

In some embodiments, the picture taken by the user or the picture selected from the mobile phone album may include other content. An actual image that the user needs to convert is a part of the foregoing picture. Therefore, the user may frame a region that needs to be recognized.

In step 3140, the user clicks intelligent recognition.

In some embodiments, the user clicks to select an intelligent recognition function. In some embodiments, this intelligent recognition function is used to convert an image into a document format. In some embodiments, the function may be triggered by the conversion control. In some embodiments, during triggering of the conversion function corresponding to the conversion control, when the terminal is implemented as a mobile terminal including a touch display screen, the conversion function may be implemented by touching the conversion control; and when the terminal is implemented as a portable laptop or desktop, the conversion control may be selected by using an external input device, such as a keyboard and a mouse.

In step 3150, a terminal uses the framed region as a to-be-recognized image, and sends the to-be-recognized image to a server.

In some embodiments, the terminal obtains the framed region from the original image in a cutout manner according to the framing of the user as a to-be-recognized image, and sends the to-be-recognized image to the server.

In step 3160, the server recognizes text and typesetting in the to-be-recognized image.

In some embodiments, the process of recognizing the text and the typesetting in the to-be-recognized image by the server has been described in detail in the foregoing embodiments, and details are not described herein again.

In step 3170, the server sends a preview image of an electronic document to the terminal.

In some embodiments, the server sends the converted content (plain text, a text style, a style set) to the terminal, or the server adds the converted content to the electronic document to obtain the target document, and then sends the preview image of the target document to the terminal.

In step 3180, the user confirms the converted content.

In step 3190, the server inserts the converted content into the electronic document to obtain a target document, and sends the target document to the terminal.

In some embodiments, when the server sends the converted content (plain text, a text style, a style set) to the terminal, after the user determines a plain text recognition result, a text style recognition result, and the style set, the server adds the converted content to the electronic document, and sends the target document to the terminal. Alternatively, after adding the converted content to the electronic document to obtain the target document, the server sends a preview image of the target document to the terminal, and the user may preview the target document by using the terminal and selects to upload an image again for conversion or confirm the converted result according to a preview result. When the user selects to confirm the conversion result, the server sends document content of the target document to the terminal.

Figure 32:
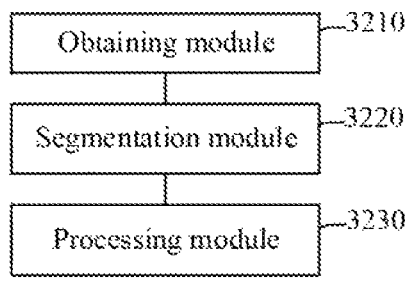
FIG. 32 is a structural block diagram of an apparatus of image-to-document conversion according to some exemplary embodiments of this application.

FIG. 32 is a structural block diagram of an apparatus of image-to-document conversion based on OCR according to some exemplary embodiments of this application. Descriptions are provided by using an example in which the apparatus is applied to a server. As shown in FIG. 32, the apparatus includes an obtaining module 3210, a segmentation module 3220, and a processing module 3230. One or more of the modules can be implemented by processing circuitry, software, or a combination thereof, for example.

The obtaining module 3210 is configured to obtain a to-be-converted image, the to-be-converted image being an image whose image content is to be converted into a target document.

The segmentation module 3220 is configured to perform layout segmentation on the to-be-converted image according to the image content of the to-be-converted image, to obtain n image layouts, each of the image layouts being corresponding to a content type, and n being a positive integer.

The processing module 3230 is configured to: for each of the image layouts, process image content in the each image layout (respective image layout) according to the content type corresponding to the each image layout (respective image layout), to obtain converted content corresponding to the each image layout (respective image layout).

The processing module 3230 is further configured to add the converted content corresponding to the n image layouts to an electronic document, to obtain the target document.

Figure 33:
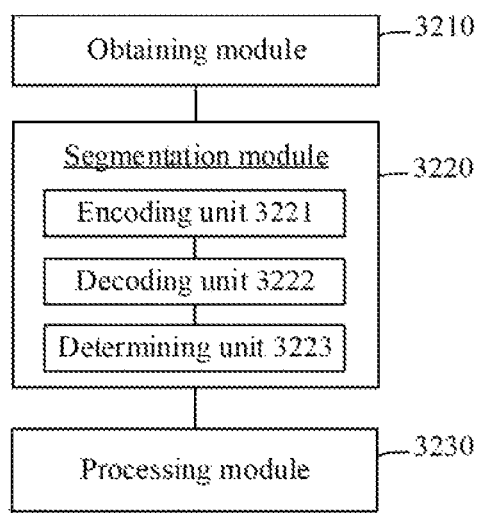
FIG. 33 is a structural block diagram of an apparatus of image-to-document conversion according to some other exemplary embodiments of this application.

In some embodiments, as shown in FIG. 33, the segmentation module 3220 includes an encoding unit 3221, configured to encode the to-be-converted image by using an encoder, to obtain encoded data, and a decoding unit 3222, configured to decode the encoded data by using a decoder, to obtain a mask image. The segmentation module 3220 also includes and a determining unit 3223, configured to obtain the n image layouts according to regions in the mask image. One or more of the modules and/or units can be implemented by processing circuitry, software, or a combination thereof, for example.

In some embodiments, the determining unit 3223 is further configured to: perform correction processing for the regions in the mask image, to obtain the n image layouts, the correction processing including at least one of denoising processing, combination processing, and intersection position cutting processing. The denoising processing includes filtering out regions in the mask image whose areas are smaller than a preset area, while the combination processing including combining consecutive regions belonging to the same content type. The intersection position cutting processing being used for performing separation and cutting for regions that intersect each other.

In some embodiments, the mask image further includes a single-column splitter bar.

The determining unit 3223 is further configured to split the corrected mask image according to the single-column splitter bar, to obtain at least two split mask images.

The determining unit 3223 is further configured to correct regions in each of the at least two split mask images.

The determining unit 3223 is further configured to generate rectangular boxes corresponding to the corrected regions in the split mask images as the n image layouts.

In some embodiments, the content type includes text, and the processing module 3230 is further configured to perform text recognition on the image content in the each image layout (respective image layout), to obtain a text recognition result of segmentation based on text lines. The processing module 3230 is also configured to determine a paragraph formation result of the text lines according to line-direction features of the text lines, the paragraph formation result representing a segmentation manner for the text recognition result, and the line-direction feature including at least one of a line height and a line spacing. The processing module 3230 is further configured to re-segment the text recognition result according to the paragraph formation result, to obtain a text conversion result corresponding to the each image layout (respective image layout).

In some embodiments, the processing module 3230 is further configured to generate a histogram according to the line-direction features of the text lines, and set a threshold corresponding to the line-direction features according to a distribution of the line-direction features in the histogram. The processing module 3230 is also configured to determine a text line as a paragraph formation line in response to a determination that the line-direction feature of the text line reaches the threshold, the paragraph formation line being used for representing that the text line is a beginning or an end of a paragraph.

In some embodiments, the content type includes a table, and the processing module 3230 is further configured to obtain cells of a target table according to borders in the each image layout (respective image layout) and perform calculation for the image content in the each image layout (respective image layout), to obtain character coordinates. The processing module 3230 is also configured to obtain the target table as a table conversion result corresponding to the each image layout according to the character coordinates and the cells.

In some embodiments, the processing module 3230 is further configured to determine horizontal borders and vertical borders according to the borders in the each image layout (respective image layout), and determine intersections between the horizontal borders and the vertical borders. The processing module 3230 is also configured to obtain the cells of the target table according to the horizontal borders, the vertical borders, and the intersections between the horizontal borders and the vertical borders.

In some embodiments, the processing module 3230 is further configured to recognize the borders in the each image layout (respective image layout), and obtain the horizontal borders and the vertical borders by correcting the recognized borders in the each image layout (respective image layout) to a horizontal direction or a vertical direction.

In some embodiments, the processing module 3230 is further configured to correct the each image layout (respective image layout) by correcting the recognized borders in the each image layout (respective image layout) to the horizontal direction or the vertical direction, and perform calculation for the image content in the corrected image layout, to obtain the character coordinates.

In some embodiments, the content type includes a picture, and the processing module 3230 is further configured to perform picture cropping for the image content in the each image layout (respective image layout), and use a picture obtained through the picture cropping as converted picture content corresponding to the each image layout (respective image layout).

In some embodiments, the content type includes a formula, and the processing module 3230 is further configured to perform picture cropping for the image content in the each image layout (respective image layout), and use a picture obtained through the picture cropping as converted formula content corresponding to the each image layout (respective image layout).

In some embodiments, the obtaining module 3210 is further configured to obtain a to-be-rectified image, and the obtaining module 3210 is further configured to input the to-be-rectified image to a rectification neural network, to output the to-be-converted image. The rectification neural network is a network obtained through training with a simulation dataset, simulation data in the simulation dataset being data obtained after distortion processing is performed on a sample image. The distortion processing is implemented by inputting the sample image to a distortion function.

Figure 34:
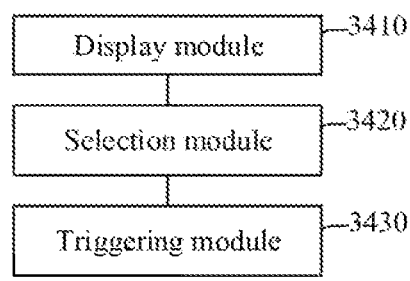
FIG. 34 is a structural block diagram of an apparatus of image-to-document conversion according to some other exemplary embodiments of this application.

FIG. 34 is a structural block diagram of an apparatus of image-to-document conversion based on OCR according to some exemplary embodiments of this application. Descriptions are provided by using an example in which the apparatus is applied to a terminal. As shown in FIG. 34, the apparatus includes a display module 3410, a selection module 3420, and a triggering module 3430.

The display module 3410 is configured to display a conversion interface, the conversion interface including a conversion control and an image selection region.

The selection module 3420 is configured to select a to-be-converted image in the image selection region, the to-be-converted image being an image whose image content is to be converted into a target document.

The triggering module 3430 is configured to trigger a conversion function corresponding to the conversion control in response to triggering of the conversion control, the conversion function being used for converting an image into a document format.

The display module 3410 is further configured to display a target document display interface, the target document display interface including the target document obtained after the to-be-converted image is converted, a typesetting manner of the target document corresponding to and consistent with that of the to-be-converted image. The target document is obtained by the conversion function in the following manner Layout segmentation is performed on the to-be-converted image according to the image content of the to-be-converted image, to obtain n image layouts, each of the image layouts corresponding to a content type, and n being a positive integer. For each of the image layouts, image content in the each image layout (respective image layout) is processed according to the content type corresponding to the each image layout (respective image layout), to obtain converted content corresponding to the each image layout (respective image layout). The converted content corresponding to the n image layouts is added to an electronic document, to obtain the target document.

In some embodiments, a content type in a first target region of the target document is consistent with a content type in a second target region of the to-be-converted image, and a position of the first target region in the target document corresponds to a position of the second target region in the to-be-converted image.

The content type may include at least one of text, a picture, a table, and a formula.

The apparatus of image-to-document conversion based on OCR provided in the foregoing embodiments is illustrated with an example of division of the foregoing function modules. In practical application, the foregoing functions may be allocated to and completed by different function modules according to requirements, that is, the internal structure of the apparatus is divided into different function modules, so as to complete all or part of the functions described above. In addition, the apparatus of image-to-document conversion based on OCR provided in the foregoing embodiments belongs to the same concept as the embodiments of the method of image-to-document conversion based on OCR. For a specific implementation process, reference may be made to the method embodiments, and details are not described herein again.

Figure 35:
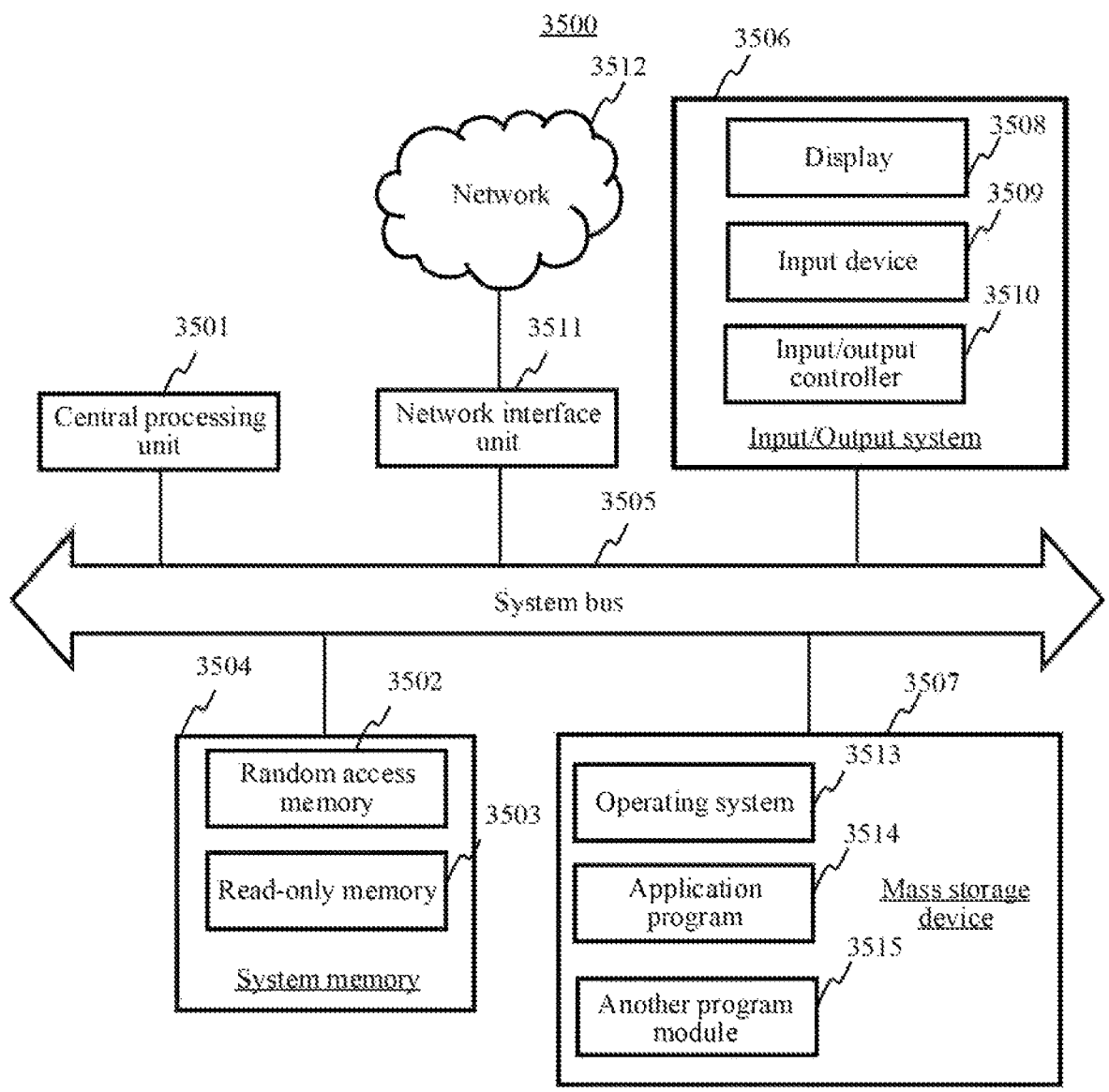
FIG. 35 is a structural block diagram of a server according to some exemplary embodiments of this application.

This application further provides a server, including a processor (processing circuitry) and a memory, the memory storing at least one instruction, the at least one instruction being loaded and executed by the processor to implement the method of image-to-document conversion based on OCR provided in the foregoing method embodiments. The server may be a server provided in FIG. 35, as described below, FIG. 35 is a schematic structural diagram of a server according to some exemplary embodiments of this application. Specifically, the server 3500 includes a central processing unit (CPU) 3501, a system memory 3504 including a random access memory (RAM) 3502 and a read-only memory (ROM) 3503, and a system bus 3505 connecting the system memory 3504 and the CPU 3501. The server 3500 further includes a basic input/output system (I/O system) 3506 for transmitting information between components in a computer, and a mass storage device 3507 configured to store an operating system 3513, an application program 3514, and another program module 3515.

The basic I/O system 3506 includes a display 3508 configured to display information and an input device 3509 such as a mouse or a keyboard that is configured to input information by a user. The display 3508 and the input device 3500 are both connected to the CPU 3501 by using an input/output controller 3510 connected to the system bus 3505. The basic I/O system 3506 may further include the input/output controller 3510, to receive and process inputs from a plurality of other devices, such as the keyboard, the mouse, or an electronic stylus. Similarly, the input/output controller 3510 further provides an output to a display screen, a printer, or another type of output device.

The mass storage device 3507 is connected to the CPU 3501 by using a mass storage controller (not shown) connected to the system bus 3505. The mass storage device 3507 and an associated computer-readable medium provide non-volatile storage for the server 3500. That is, the mass storage device 3507 may include a computer-readable medium (not shown), such as a hard disk or a CD-ROM drive.

Without loss of generality, the computer-readable medium may include a non-transitory computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 3504 and the mass storage device 3507 may be collectively referred to as a memory.

The memory stores one or more programs. The one or more programs are configured to be executed by the one or more CPUs 3501, the one or more programs include instructions that are used for implementing the foregoing method of image-to-document conversion based on OCR, and the CPU 3501 executes the one or more programs to implement the method of image-to-document conversion based on OCR provided in the foregoing method embodiments.

According to the embodiments of this application, the server 3500 may further be connected, by using a network such as the Internet, to a remote computer on the network. That is, the server 3500 may be connected to a network 3512 by using a network interface unit 3511 connected to the system bus 3505, or may be connected to another type of network or a remote computer system (not shown) by using a network interface unit 3511.

The memory further includes one or more programs. The one or more programs are stored in the memory and include steps to be executed by the server in the method of image-to-document conversion based on OCR provided in the embodiments of this application.

The embodiments of this application further provide a computer device, including a memory and a processor (processing circuitry) connected to the memory, the memory being non-transitory and storing at least one machine-readable instruction, the at least one machine-readable instruction being loaded by the processor to implement the method of image-to-document conversion based on OCR according to any one of FIG. 3. FIG. 16, FIG. 21, and FIG. 30.

The embodiments of this application further provide a non-volatile and non-transitory computer-readable storage medium, storing at least one machine-readable instruction, the at least one machine-readable instruction being loaded and executed by a processor (processing circuitry) to implement the method of image-to-document conversion based on OCR according to any one of FIG. 3, FIG. 16, FIG. 21, and FIG. 30.

This application further provides a computer program product, the computer program product, when run on a computer, causing the computer to perform the method of image-to-document conversion based on OCR according to the foregoing method embodiments.

A person of ordinary skill in the art may understand that all or some of the steps of the methods in the embodiments may be implemented by a program instructing relevant hardware. The program may be stored in a non-volatile computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, and a code set or an instruction set, the at least one instruction, the at least one program, and the code set or the instruction set being loaded and executed by the processor to implement the method of image-to-document conversion based on OCR according to any one of FIG. 3, FIG. 16, FIG. 21, and FIG. 30.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purposes, and are not intended to indicate the preference among the embodiments.

A person of ordinary skill in the art may understand that all or some of the steps of the embodiments may be implemented by hardware, or may be implemented by a program instructing related hardware. The program may be stored in a non-volatile computer-readable storage medium. The storage medium mentioned above may include: a ROM, a magnetic disk, or an optical disc.

The foregoing descriptions are merely exemplary embodiments of this application, but are not intended to limit this application. Any modification, equivalent replacement, or improvement and the like made within the principle of this application fall within the protection scope of this application.

What is claimed is:

1. A method of image-to-document conversion based on optical character recognition (OCR), the method comprising:

obtaining an image to be converted into a target document;

classifying regions of the image according to image content of the image, to obtain n image regions, each of the n image regions being classified to a corresponding content type, n being an integer greater than or equal to 3, and at least 3 of the n image regions being classified into different respective content types, wherein the n image regions are obtained by performing (i) combination processing including combining consecutive regions of the image belonging to a same content type, (ii) generating a binary tree having the n image regions as nodes, (iii) performing depth traversing of the binary tree to obtain a reading sequence, and (iv) performing intersection processing including adjusting positions of regions that intersect each other based on the reading sequence;

for each of the n image regions, processing image content in the respective image region, by processing circuitry of a server, according to the content type to which the respective image region was classified, to obtain converted content corresponding to the respective image region; and adding the converted content corresponding to the n image regions to an electronic document, to obtain the target document.

2. The method according to claim 1, wherein the classifying comprises:

encoding the image by using an encoder, to obtain encoded data;

decoding the encoded data by using a decoder, to obtain a mask image; and obtaining the n image regions according to regions in the mask image.

3. The method according to claim 2, wherein the obtaining the n image regions according to the regions in the mask image comprises:

performing correction processing for the regions in the mask image, to obtain the n image regions, the correction processing comprising denoising processing, the combination processing, and the intersection processing to generate a corrected mask image, and the denoising processing comprising filtering out regions in the mask image whose areas are smaller than a preset area.

4. The method according to claim 3, wherein the mask image further comprises a single-column splitter bar; and the performing the correction processing for the regions in the mask image comprises:

splitting the corrected mask image according to the single-column splitter bar, to obtain at least two split mask images;

correcting regions in each of the at least two split mask images; and generating rectangular boxes corresponding to the corrected regions in the split mask images as the n image regions.

5. The method according to claim 1, wherein the content type of one of the n image regions comprises text; and the processing image content in the respective image region comprises:

performing text recognition on the image content in the respective image region, to obtain a text recognition result of segmentation based on text lines;

determining a paragraph formation result of the text lines according to line-direction features of the text lines, the paragraph formation result representing a segmentation manner for the text recognition result, and the line-direction features comprising at least one of a line height and a line spacing; and re-segmenting the text recognition result according to the paragraph formation result, to obtain a text conversion result corresponding to the respective image region.

6. The method according to claim 5, wherein the determining comprises:

generating a histogram according to the line-direction features of the text lines;

setting a threshold corresponding to the line-direction features according to a distribution of the line-direction features in the histogram; and determining a text line as a paragraph formation line in response to a determination that a line-direction feature of the text line reaches the threshold, the determination that the text line is the paragraph formation line representing that the text line is a beginning or an end of a paragraph.

7. The method according to claim 1, wherein the content type of one of the n image regions comprises a table; and the processing the image content in the respective image region comprises:

obtaining cells of a target table according to borders in the respective image region;

performing calculation for the image content in the respective image region, to obtain character coordinates; and obtaining the target table as a table conversion result corresponding to the respective image region according to the character coordinates and the cells.

8. The method according to claim 7, wherein the obtaining the cells of the target table comprises:

determining horizontal borders and vertical borders according to the borders in the respective image region, and determining intersections between the horizontal borders and the vertical borders; and obtaining the cells of the target table according to the horizontal borders, the vertical borders, and the intersections between the horizontal borders and the vertical borders.

9. The method according to claim 8, wherein the determining the horizontal borders and the vertical borders comprises:

recognizing the borders in the respective image region; and obtaining the horizontal borders and the vertical borders by correcting the recognized borders in the respective image region to a horizontal direction or a vertical direction.

10. The method according to claim 9, wherein the method further comprises:

correcting the respective image region by correcting the recognized borders in the respective image region to the horizontal direction or the vertical direction; and the performing the calculation for the image content in the respective image region, to obtain the character coordinates comprises performing calculation for the image content in the corrected image region, to obtain the character coordinates.

11. The method according claim 1, wherein the content type of one of the n image regions comprises a picture; and the processing the image content in the respective image region comprises:

performing picture cropping for the image content in the respective image region, and using a picture obtained through the picture cropping as converted picture content corresponding to the respective image region.

12. The method according to claim 1, wherein the content type of one of the n image regions comprises a formula; and the processing the image content in the respective image region comprises:

performing picture cropping for the image content in the respective image region, and using a picture obtained through the picture cropping as converted formula content corresponding to the respective image region.

13. The method according to claim 1, wherein the obtaining the image comprises:

obtaining a to-be-rectified image; and inputting the to-be-rectified image to a rectification neural network configured to output the image, the rectification neural network being a network obtained through training with a simulation dataset, simulation data in the simulation dataset being data obtained after distortion processing is performed on a sample image.

14. A method of image-to-document conversion based on optical character recognition (OCR), the method comprising:

displaying a conversion interface, the conversion interface comprising a conversion control and an image selection region;

selecting an image in the image selection region, the image to be converted into a target document;

triggering a conversion function corresponding to the conversion control in response to triggering of the conversion control, the conversion function converting the image into a document format; and displaying, by processing circuitry of a terminal device, a target document display interface, the target document display interface comprising the target document obtained after the image is converted, a typesetting manner of the target document corresponding to a typesetting manner of the image, the target document being obtained by the conversion function in a manner comprising classifying regions of the image according to image content of the image, to obtain n image regions, each of the image regions being classified to a corresponding content type, n being an integer greater than or equal to 3, and at least 3 of the n image regions being classified into different respective content types, wherein the n image regions are obtained by performing (i) combination processing including combining consecutive regions of the image belonging to a same content type, (ii) generating a binary tree having the n image regions as nodes, (iii) performing depth traversing of the binary tree to obtain a reading sequence, and (iv) performing intersection processing including adjusting positions of regions that intersect each other based on the reading sequence;

for each of the n image regions, processing the image content in the respective image region according to the content type to which the respective image region was classified, to obtain converted content corresponding to the respective image region; and adding the converted content corresponding to the n image regions to an electronic document, to obtain the target document.

15. The method according to claim 14, wherein a content type in a first target region of the target document is consistent with a content type in a second target region of the image, and a position of the first target region in the target document corresponds to a position of the second target region in the image, the content type comprising at least one of text, a picture, a table, and a formula.

16. An apparatus of image-to-document conversion based on optical character recognition (OCR), comprising:

processing circuitry configured to obtain an image to be converted into a target document;

classifying regions of the image according to image content of the image, to obtain n image regions, each of the image regions being classified to a corresponding content type, n being an positive integer greater than or equal to 3, and at least 3 of the n image regions being classified into different respective content types, wherein the n image regions are obtained by performing (i) combination processing including combining consecutive regions of the image belonging to a same content type, (ii) generating a binary tree having the n image regions as nodes, (iii) performing depth traversing of the binary tree to obtain a reading sequence, and (iv) performing intersection processing including adjusting positions of regions that intersect each other based on the reading sequence;

for each of the image regions, process image content in the respective image region according to the content type to which the respective image region was classified, to obtain converted content corresponding to the respective image region; and add the converted content corresponding to the n image regions to an electronic document, to obtain the target document.

17. A computer device, comprising:

a processor; and a memory connected to the processor, the memory storing machine-readable instructions, the machine-readable instructions being loaded and executed by the processor to implement the method of image-to-document conversion based on optical character recognition (OCR) according to claim 1.

18. A non-transitory computer-readable storage medium, storing machine-readable instructions, the machine-readable instructions being loaded and executed by a processor to implement the method of image-to-document conversion based on optical character recognition (OCR) according to claim 1.

19. A computer device, comprising:

a processor; and a memory connected to the processor, the memory storing machine-readable instructions, the machine-readable instructions being loaded and executed by the processor to implement the method of image-to-document conversion based on optical character recognition (OCR) according to claim 14.

20. A non-transitory computer-readable storage medium, storing machine-readable instructions, the machine-readable instructions being loaded and executed by a processor to implement the method of image-to-document conversion based on optical character recognition (OCR) according to claim 14.

* * * * *

UNITED STATES PATENT AND TRADEMARK OFFICE
CERTIFICATE OF CORRECTION

PATENT NO. : 12,154,361 B2  
APPLICATION NO. : 17/313755  
DATED : November 26, 2024  
INVENTOR(S) : Xingyao Chen e al.

Page 1 of 1

It is certified that error appears in the above-identified patent and that said Letters Patent is hereby corrected as shown below:

On the Title Page

Item (71), the Applicant city reads as:  
Guangdong (CN)  
Should read as:  
--Shenzhen (CN)--

Item (72), all eight (8) inventors city reads as:  
Guangdong (CN)  
Should read as:  
--Shenzhen (CN)--

Signed and Sealed this  
Twenty-fifth Day of February, 2025

Coke Morgan Stewart  
*Acting Director of the United States Patent and Trademark Office*